United States Patent
Tada

(10) Patent No.: US 8,550,393 B2
(45) Date of Patent: Oct. 8, 2013

(54) RECORDING TAPE CARTRIDGE

(75) Inventor: Nobuyuki Tada, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 266 days.

(21) Appl. No.: 12/970,977

(22) Filed: Dec. 17, 2010

(65) Prior Publication Data

US 2011/0163193 A1 Jul. 7, 2011

(30) Foreign Application Priority Data

Jan. 7, 2010 (JP) ................................. 2010-002016

(51) Int. Cl.
*G11B 23/107* (2006.01)

(52) U.S. Cl.
USPC ......................... 242/348; 242/332.4; 360/132

(58) Field of Classification Search
USPC ................ 242/347, 348, 348.1, 348.2, 332.4, 242/532.6; 360/132
See application file for complete search history.

(56) References Cited

U.S. PATENT DOCUMENTS

| | | | |
|---|---|---|---|
| 6,702,215 B2 * | 3/2004 | Stamm et al. ................. | 242/348 |
| 6,824,320 B1 * | 11/2004 | Kerr et al. ..................... | 242/348 |
| 7,227,721 B1 * | 6/2007 | Kientz et al. .................. | 360/132 |
| 7,516,913 B2 * | 4/2009 | Ashikawa ...................... | 242/348 |
| 7,770,835 B2 * | 8/2010 | Sumiya et al. ................. | 242/348 |
| 7,780,107 B2 * | 8/2010 | Onmori et al. ................. | 242/348 |
| 7,918,412 B2 * | 4/2011 | Takenoshita et al. .......... | 242/348 |
| 2004/0007639 A1 * | 1/2004 | Hiraguchi ...................... | 242/348 |
| 2006/0180694 A1 * | 8/2006 | Battles et al. .................. | 242/348 |
| 2007/0058290 A1 * | 3/2007 | Tada et al. ..................... | 242/348 |
| 2009/0242681 A1 * | 10/2009 | Sumiya et al. ................. | 242/348 |

FOREIGN PATENT DOCUMENTS

| JP | 04-049384 U | 4/1992 |
|---|---|---|
| JP | 2007-257744 A | 10/2007 |

OTHER PUBLICATIONS

Partial English language translation of the following: Office action dated May 21, 2013 from the Japanese Patent Office in a Japanese patent application corresponding to the instant patent application. This office action translation is submitted now in order to supplement the understanding of patent document JP 04-049384 which is cited in the office action and is being disclosed in the instant Information Disclosure Statement.

* cited by examiner

*Primary Examiner* — William A Rivera
(74) *Attorney, Agent, or Firm* — SOLARIS Intellectual Property Group, PLLC

(57) ABSTRACT

A recording tape cartridge has: a reel around which a recording tape is wound; a UHF band RFID tag structured to include a tag antenna formed such that radiating portions are disposed at both sides of a power feed portion; and a case in which the reel is housed. Radiating portion spaces, in which are housed regions of the UHF band RFID tag at which the radiating portions are set, and a power feed portion space, in which is housed at least a portion of a region at which the power feed portion is set, are formed within the case at an outer side of a reel space. Regions at which the radiating portions are formed do not contact a reel area rib and a rear upper wall that surround the radiating portion spaces.

14 Claims, 26 Drawing Sheets

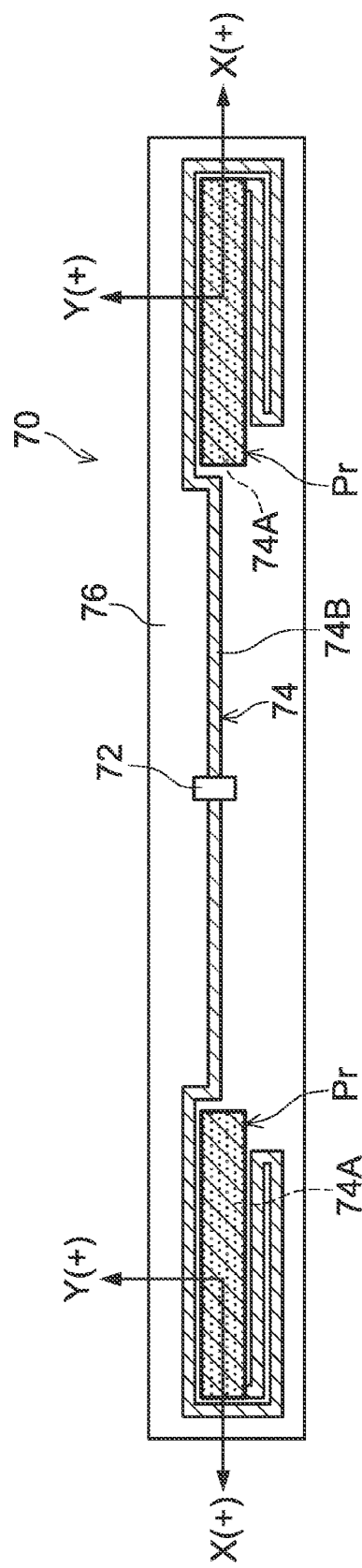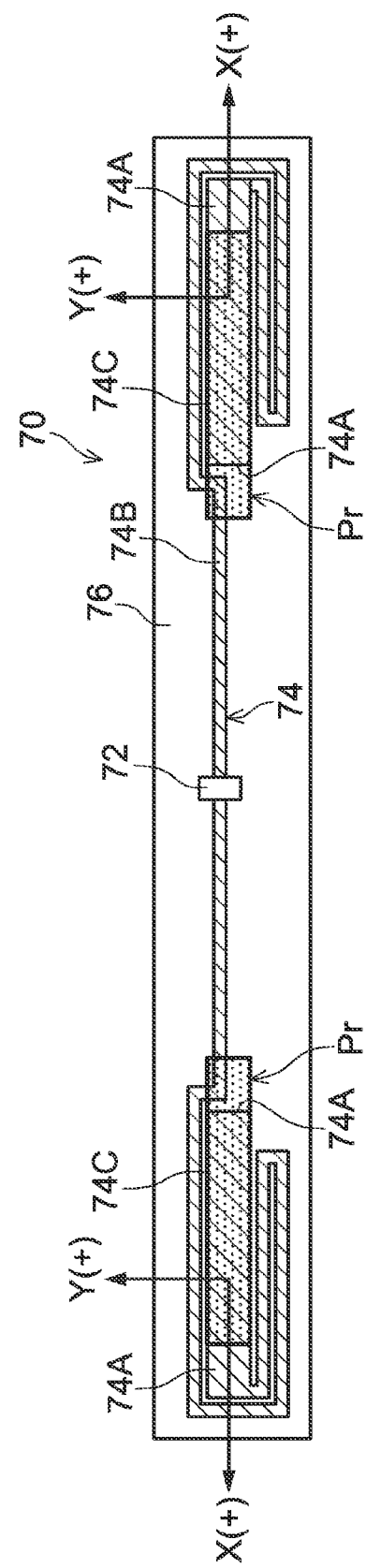

RECORDING TAPE CARTRIDGE

CROSS-REFERENCE TO RELATED APPLICATION

This application claims priority under 35 USC 119 from Japanese Patent Application No. 2010-002016, filed Jan. 7, 2010, the disclosure of which is incorporated by reference herein.

BACKGROUND

1. Technical Field

The present invention relates to a recording tape cartridge in which an RFID tag is built-in.

2. Related Art

Magnetic tape cartridges, in which an RFID tag is disposed along the inner surface of the rear wall portion of a cartridge case, are known (see, for example, Japanese Patent Application Laid-Open (JP-A) No. 2007-257744).

However, in technologies such as the aforementioned, in cases in which the cartridge case is formed by resin molding, the performance of the RFID tag is affected by the cartridge case (material) that is a dielectric. Further, because the materials of the magnetic tape, the reel and the like are also considered to be dielectrics, they similarly affect the performance of the RFID tag.

SUMMARY

The present invention provides a recording tape cartridge in which a built-in RFID tag in a case, is not influenced by the permittivity of the case.

A recording tape cartridge of a first aspect of the present invention has: a reel around which a recording tape is wound; an RFID tag including an antenna that is formed in a rectangular shape whose short-side direction is a transverse direction of the recording tape, and that is formed such that radiating portions are disposed at both sides of a power feed portion; and a case having a reel space in which the reel is housed, a power feed portion space in which a central portion of the antenna that includes a portion of the power feed portion is housed, and radiating portion spaces in which the radiating portions of the antenna are housed respectively, and boundary portions that structure the radiating portion space do not contact at least a portion of the radiating portion.

In the recording tape cartridge of the first aspect, the power feed portion at the antenna of the RFID tag is housed in the power feed portion space of the case, and the respective radiating portions at the antenna are housed in the respective radiating portion spaces of the case. At least a portion of each of the radiating portions of the RFID tag does not contact the boundary portions that structure the radiating portion space, and therefore, the RFID tag is not influenced by the permittivity of the case (materials).

In this way, in the recording tape cartridge of the first aspect, the RFID tag, that is built-in, is not influenced by the permittivity of the case. Note that the boundary portions that structure the radiating portion spaces may be interpreted as being walls that partition the interior and exterior of the case, or walls, projections or the like that exist between the radiating portion spaces and other spaces within the case, or may be interpreted as being wall surfaces, surfaces of projections or the like that are boundary surfaces between the radiating portion spaces and these walls or (solid portions of) the projections.

In a recording tape cartridge of a second aspect of the present invention, in the recording tape cartridge of the first aspect, at the case, a clearance, in a normal line direction of the radiating portion or boundary portions, between the boundary portions that structure the radiating portion space is larger than a clearance, in a normal line direction of boundary portions or the power feed portion, between the boundary portions that structure the power feed portion space.

In the recording tape cartridge of the second aspect, at the case, the clearance between the plural boundary portions in the normal line direction of the radiating portion or the boundary portions at each of the radiating portion spaces is larger than the clearance between the plural boundary portions in the normal line direction of the power feed portion or the boundary portions that structure the power feed portion space. In this way, the radiating portion spaces are wider than the power feed portion space in the normal line direction of the antenna or the boundary portions. Therefore, by disposing the radiating portions to be further apart from the boundary portions than the power feed portion, the RFID tag can be made not to be influenced by the permittivity of the case. On the other hand, the power feed portion, that is the region at the antenna that is not influenced by the permittivity of the case, can be disposed so as to be adjacent to a boundary portion, and the RFID tag can be disposed by effectively utilizing the space within the case. Because the radiating portions can be disposed in spaces that are relatively wide with respect to the power feed portion, this structure is particularly effective in cases in which radiating portion spaces that are sufficiently large cannot be ensured within the recording tape cartridge.

In a recording tape cartridge relating to a third aspect of the present invention, in the recording tape cartridge of the first aspect, the case is structured such that one of the radiating portion spaces is disposed in one corner portion that is positioned at an outer side of the reel as seen from an axial direction of the reel, and the other of the radiating portion spaces is disposed in another corner portion that is adjacent, in a round direction, to the corner portion.

In the recording tape cartridge of the third aspect, the radiating portion spaces are disposed one in each of two corner portions within the case that are adjacent to one another in the round direction at the outer side of the reel (the reel space) that forms a circular shape as seen in the axial direction. On the other hand, the power feed portion space is disposed at a portion positioned between the two corner portions. Due thereto, the limited space within the case that has the reel space is utilized, and the relatively wide radiating portion spaces can be disposed at the both sides of the relatively narrow power feed portion space. Further, the radiating portions of the antenna can be disposed so as to be apart from the boundary portions in the radiating portion spaces that are wide spaces as described above, and the RFID tag can be made not to be influenced by the permittivity of the case.

In a recording tape cartridge of a fourth aspect of the present invention, in the recording tape cartridge of the first aspect, a clearance between a portion, that is nearest to the radiating portion at the boundary portions that structure the radiating portion space, and the radiating portion is greater than a distance between a portion, that is nearest to the power feed portion at boundary portions that structure the power feed portion space, and the power feed portion.

In the recording tape cartridge of the fourth aspect, the distance (shortest distance), in the normal line direction, between the radiating portion of the antenna and the boundary portion that structures the radiating portion space is greater than the distance (shortest distance) between the power feed portion and the boundary portion that structures the power feed portion space. Here, it is easier for the RFID tag to be affected by the permittivity of the case at the radiating portions than at the power feed portion. Accordingly, by disposing the radiating portions to be apart from the boundary portions that structure the radiating portion spaces as described above, it becomes that the RFID tag is not influenced by the permittivity of the case. On the other hand, the power feed portion, that is the region at the antenna that is not to be influenced by the permittivity of the case, is disposed relatively adjacent to a boundary portion that structures the power feed portion space. Therefore, the RFID tag is disposed while effectively utilizing the space within the case.

In a recording tape cartridge of a fifth aspect of the present invention, in the recording tape cartridge of the first aspect, a sum of distances between respective boundary portions, that are positioned at both sides in a thickness direction of the radiating portion at the radiating portion space, and the radiating portion is greater than a sum of distances between respective boundary portions, that are positioned at both sides in a thickness direction of the power feed portion at the power feed portion space, and the power feed portion.

In the recording tape cartridge of the fifth aspect, at the radiating portion of the antenna, the sum of the distances to the boundary portions that structure the radiating portion space at the both sides in the thickness direction of the radiating portion, is greater than the sum of the distances to the boundary portions that structure the power feed portion space at both sides in the thickness direction of the power feed portion. Namely, the radiating portions are disposed in spaces that are wider in the thickness direction (the normal line direction) than the power feed portion. Here, it is easier for the RFID tag to be affected by the permittivity of the case at the radiating portions than at the power feed portion. Accordingly, by disposing the radiating portions in spaces that are wide in the thickness direction as described above, the RFID tag can be made not to be influenced by the permittivity of the case. On the other hand, because the power feed portion is disposed in a space that is relatively narrow in the thickness direction, the RFID tag is disposed while effectively utilizing the space within the case.

In a recording tape cartridge of a sixth aspect of the present invention, in the recording tape cartridge of the first aspect, the radiating portion of the antenna is disposed so as to be apart, by greater than or equal to 2 mm, from the boundary portions that structure the radiating portion space.

In the recording tape cartridge of the sixth aspect, the radiating portion of the antenna is separated, by greater than or equal to 2 mm, from the boundary portions that structure the radiating portion space. Therefore, the performance of the RFID tag is not influenced by the permittivity of the case easily.

In a recording tape cartridge of a seventh aspect of the present invention, in the recording tape cartridge of the first aspect, the radiating portion of the antenna is disposed so as to be apart, by greater than or equal to 4 mm, from the boundary portions that structure the radiating portion space.

In the recording tape cartridge of the seventh aspect, the radiating portion of the antenna is separated, by greater than or equal to 4 mm, from the boundary portions that structure the radiating portion space. Therefore, the performance of the RFID tag is not influenced by the permittivity of the case easily.

In a recording tape cartridge of an eighth aspect of the present invention, in the recording tape cartridge of the first aspect, the case has a standing portion that stands at an inner side of an outer peripheral wall, and at least a portion of each of the radiating portion spaces is disposed within a space that is surrounded by the standing portion and the outer peripheral wall.

In the recording tape cartridge of the eighth aspect, a space, that is surrounded by the outer peripheral wall of the case and the standing portion, is formed within the case. At least a portion of the radiating portion space is disposed (formed) within this space. In this way, in the present recording tape cartridge, the radiating portions can be disposed by utilizing the space that is surrounded by the outer peripheral wall and the standing portion within the case. Note that the outer peripheral wall and the standing portion may form at least a portion of the boundary portions that structure the radiating portion space. Or, another standing portion or the like, that is positioned within the space surrounded by the outer peripheral portion and the standing portion, may be at least a portion of the boundary portions that structure the radiating portion space. Examples of the standing portion are wall-shaped structures (inner walls), standing-plate-shaped structures, slit-shaped structures (plural rod-shaped bodies being formed in parallel), grid-shaped structures, protruding-rod-shaped protrusions, and the like.

In a recording tape cartridge of a ninth aspect of the present invention, in the recording tape cartridge of the first aspect, the case has a standing portion that stands at an inner side of an outer peripheral wall, and a space that is sandwiched between the standing portion and the outer peripheral wall, or a space that is sandwiched between respective standing portions that project-out in a transverse direction of the recording tape, is at least a portion of the radiating portion space.

In the recording tape cartridge of the ninth aspect, the radiating portion of the antenna that structures the RFID tag is housed within the radiating portion space that is a space sandwiched between the outer peripheral wall of the case and the standing portion, or a space that is sandwiched between respective standing portions. In this way, at the present recording tape cartridge, at least a portion of the radiating portion space can be disposed by utilizing the space in the case between the outer peripheral wall and the standing portion, or a space between standing portions. Examples of the standing portion are wall-shaped structures (inner walls), standing-plate-shaped structures, slit-shaped structures (plural rod-shaped bodies being formed in parallel), grid-shaped structures, protruding-rod-shaped protrusions, and the like.

In a recording tape cartridge of a tenth aspect of the present invention, in the recording tape cartridge of the eighth aspect, the standing portion is a separating wall that partitions the reel space and the radiating portion space.

In the recording tape cartridge of the tenth aspect, the radiating portion spaces are disposed at the outer side of a separating wall that prescribes the reel space. Therefore, the radiating portions that require a needed width (distance between radiating portions) can be easily provided at the outer side of the reel (the reel space) within the case, as compared with a structure in which a space or the like other than the separating wall is disposed between the reel space and the radiating portion spaces.

In a recording tape cartridge of an eleventh aspect of the present invention, in the recording tape cartridge of the first aspect, the radiating portion is disposed within the radiating portion space at a substantially central portion between the boundary walls that are respectively positioned at both sides in a thickness direction with respect to the radiating portion.

In the recording tape cartridge of the eleventh aspect, the radiating portion of the antenna is disposed at the substantially central portion between the boundary walls that are positioned at the both sides in the direction of thickness of the radiating portion. Due thereto, the RFID tag is less influenced by the permittivity of the case.

Namely, the RFID tag in the present recording tape cartridge is not influenced by the permittivity of the case easily, even when compared with a structure in which the radiating portion of the antenna is disposed so as to be offset toward one boundary portion side.

In a recording tape cartridge of a twelfth aspect of the present invention, in the recording tape cartridge of the tenth aspect, the outer peripheral wall and the separating wall are walls that form the boundary portions at respectively different sides, in a thickness direction of the radiating portion, at the radiating portion space, and the radiating portion is disposed within the radiating portion space such that a distance from the radiating portion to the outer peripheral wall and a distance from the radiating portion to the separating wall are equal.

In the recording tape cartridge of the twelfth aspect, the radiating portion of the antenna is disposed such that the distance from the radiating portion to the outer peripheral wall and the distance from the radiating portion to the separating wall, that are positioned at the both sides in the thickness direction of the radiating portion, are substantially equal (the radiating portion is disposed at the substantially central portion between the boundary portions). Due thereto, the RFID tag is less influenced by the permittivity of the case.

Namely, the RFID tag in the present recording tape cartridge is not influenced by the permittivity of the case easily, even when compared with a structure in which the radiating portion of the antenna is disposed so as to be offset toward the outer peripheral wall side or the separating wall side.

In a recording tape cartridge of a thirteenth aspect of the present invention, in the recording tape cartridge of the first aspect, at least a portion of the boundary portions that structure the radiating portion space at the case is a wall that stands within the case so as to face the radiating portion.

In the recording tape cartridge of the thirteenth aspect, a wall, whose permittivity easily affects the radiating portion of the antenna because the wall faces that radiating portion, structures (at least a portion of) the boundary walls that structure the radiating portion space. However, due to the structures of the first aspect, the permittivity of the wall affecting the radiating portion can be effectively suppressed.

In a recording tape cartridge of a fourteenth aspect of the present invention, in the recording tape cartridge of the first aspect, the RFID tag is supported at the case such that the power feed portion contacts a boundary portion that structures the power feed portion space.

In the recording tape cartridge of the fourteenth aspect, the power feed portion, that is a region at the antenna that is not influenced by the permittivity of the case, is disposed so as to contact a boundary portion that structures the power feed portion space. Therefore, the RFID tag can be disposed by even more effectively utilizing the space within the case.

In a recording tape cartridge of a fifteenth aspect of the present invention, in the recording tape cartridge of the first aspect, the RFID tag is held at the case via a holding member that does not contact a region of the RFID tag at which region the radiating portion is formed.

In the recording tape cartridge of the fifteenth aspect, the holding member, that holds the RFID tag with respect to the case, does not contact the region at the RFID tag at which region the radiating portion is formed. Therefore, the RFID tag is not influenced by the permittivity of the maintenance material easily.

In a recording tape cartridge of a sixteenth aspect of the present invention, in the recording tape cartridge of the first aspect, the RFID tag is held at the case via a holding member at which a width of a portion contacting a region of the RFID tag, at which region the radiating portion is formed, is less than or equal to 2 mm.

In the recording tape cartridge of the sixteenth aspect, the contact width between the holding member, that holds the RFID tag with respect to the case, and the region of the RFID tag at which region the radiating portion is formed, is less than or equal to 2 mm (including 0 mm). Therefore, the RFID tag is not influenced by the permittivity of the holding member.

BRIEF DESCRIPTION OF THE DRAWINGS

Exemplary embodiments of the present invention will be described in detail based on the following figures, wherein:

FIG. 12A is a drawing for explaining conditions of the simulations of FIG. 11A and FIG. 11B, and is a front view of a state in which the resin panels are positioned at an origin with respect to the radiating portions of the UHF band RFID tag;

FIG. 12B is a drawing for explaining conditions of the simulations of FIG. 11A and FIG. 11B, and is a front view of a state in which the resin panels are relatively displaced in an X− direction with respect to the radiating portions of the UHF band RFID tag;

DETAILED DESCRIPTION

A recording tape cartridge 10 relating to a first exemplary embodiment of the present invention is described on the basis of FIG. 1 through FIG. 13. First, the overall structure of the recording tape cartridge 10 is described, and then, a UHF band RFID tag 70 that is built in the recording tape cartridge 10, and the internal structure of the UHF band RFID tag 70, are described. Note that, in the following explanation, for convenience, the arrow U direction shown appropriately in the respective drawings is the upward direction, the arrow F direction is the forward direction, the arrow R direction is the rightward direction, and the arrow L direction is the leftward direction. However, these directions do not limit the posture of the recording tape cartridge 10.

Figure 1:
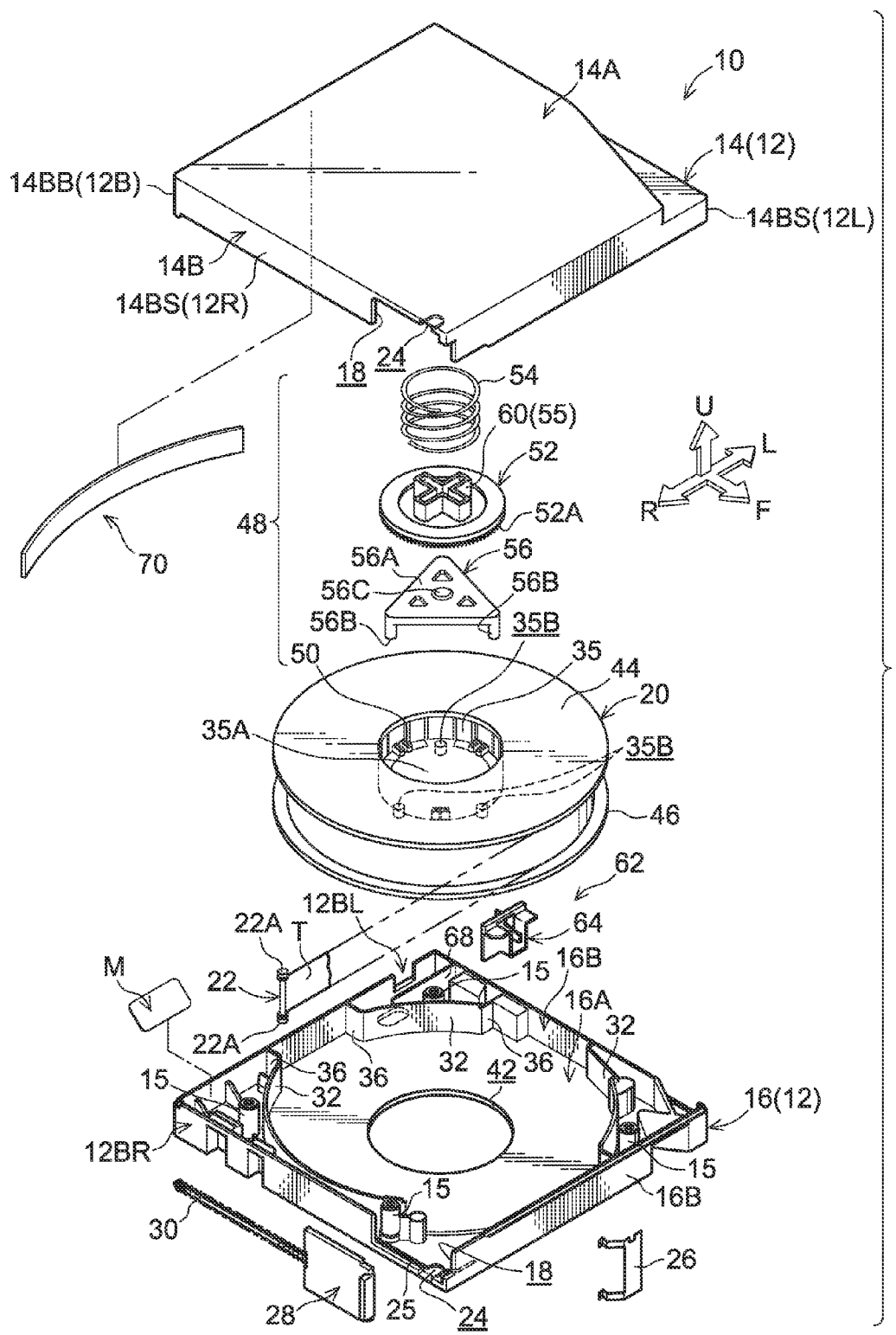
FIG. 1 is an exploded perspective view of a recording tape cartridge relating to a first exemplary embodiment of the present invention seen from above.
Figure 2:
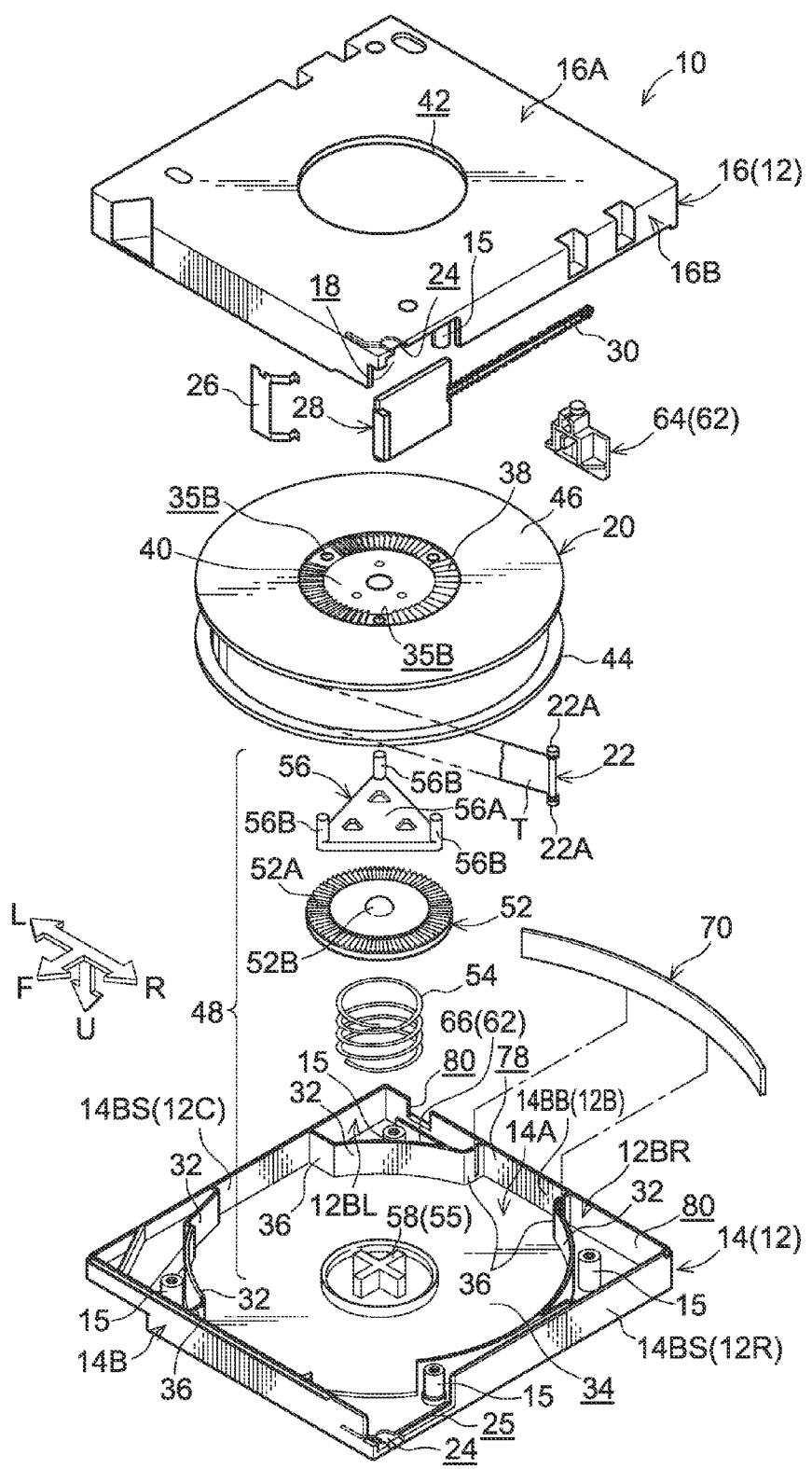
FIG. 2 is an exploded perspective view of the recording tape cartridge relating to the first exemplary embodiment of the present invention seen from below.
Figure 3:
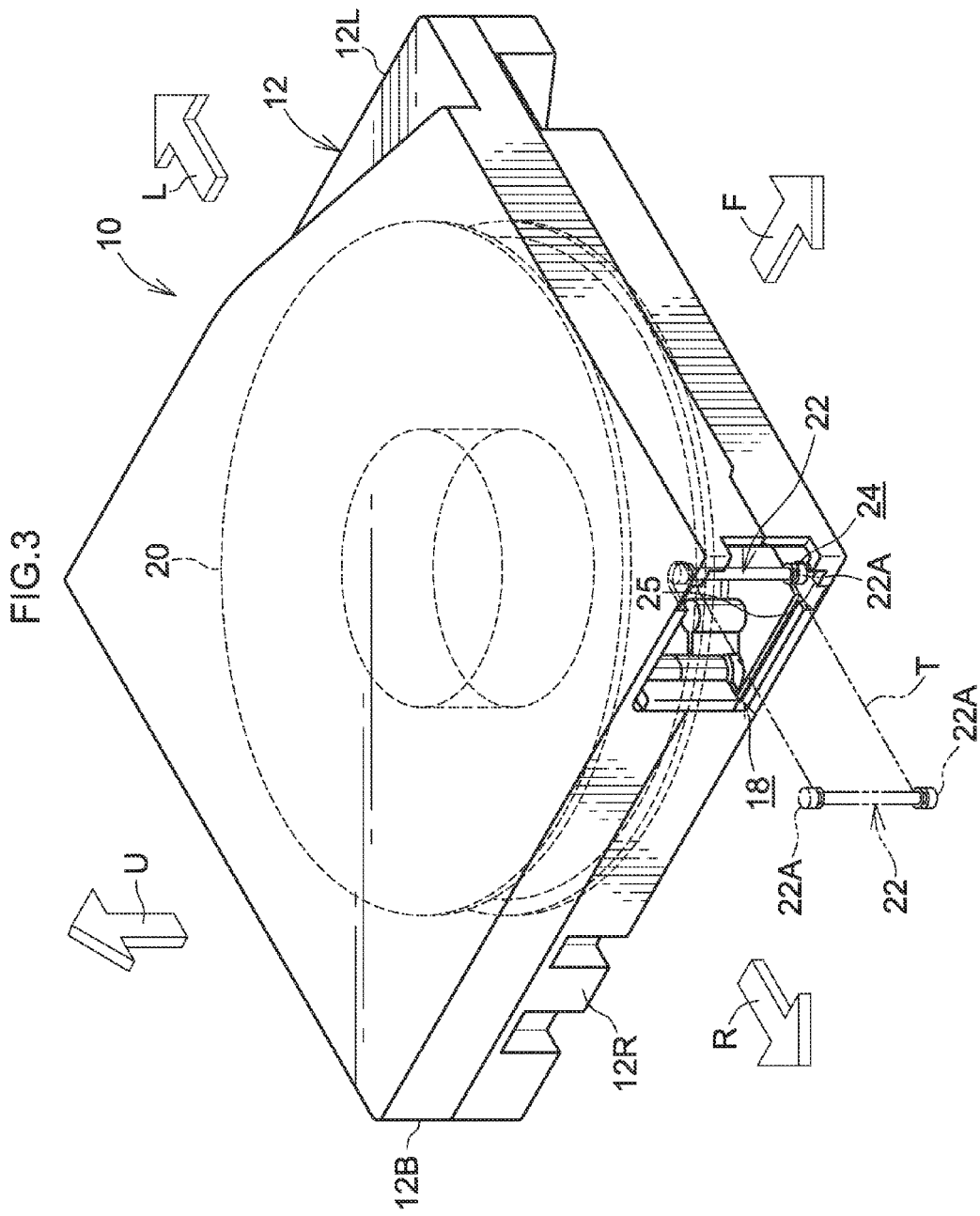
FIG. 3 is a perspective view showing the recording tape cartridge relating to the first exemplary embodiment of the present invention.

The exterior of the recording tape cartridge 10 is shown in a perspective view in FIG. 3. An exploded perspective view of the recording tape cartridge 10 seen from above is shown in FIG. 1. An exploded perspective view of the recording tape cartridge 10 seen from below is shown in FIG. 2. As shown in these drawings, the recording tape cartridge 10 has a case 12. The case 12 is structured by an upper case 14, that is made of resin and opens downward, and a lower case 16, that is made of resin and opens upward, being joined together with the respective open ends thereof abutting one another. In the present exemplary embodiment, the case 12 forms a substantial rectangular shape (square shape) as seen in plan view, and is structured as a thin, flat case in the vertical direction.

Specifically, at the upper case 14, an outer peripheral wall 14B is formed so as to stand downwardly from the peripheral edge portion of a ceiling plate 14A that is substantially rectangular in plan view. At the lower case 16, an outer peripheral wall 16B is formed so as to stand upwardly from the peripheral edge portion of a floor plate 16A that is substantially rectangular in plan view. The case 12 is structured by the upper case 14 and the lower case 16 being joined together in a state in which the open ends of the outer peripheral wall 14B and the outer peripheral wall 16B abut one another. In the present exemplary embodiment, the upper case 14 and the lower case 16 are joined together by screw bosses 15, that project-out from the ceiling plate 14A of the upper case 14 and the floor plate 16A of the lower case 16, being made to abut one another, and the screw portions of screws (not shown), whose head portions are accommodated within the lower side screw bosses 15, being screwed in the upper side screw bosses 15.

A single reel 20, on which is wound a magnetic tape T serving as a recording tape, is rotatably housed within the case 12. The magnetic tape T wound around the reel 20 is, within an unillustrated drive device, pulled-out through an opening 18, that is formed in the front end side of a right side wall 12R of the case 12, to the outer side of the case 12. Reading and writing of information is carried out on the magnetic tape T that is pulled-out from the case 12 in this way. A leader pin 22, that serves as a leader member that is manipulated (held) at the time when the magnetic tape T is pulled-out from the drive device, is attached to the distal end of the magnetic tape T.

The leader pin 22 is held at a predetermined position with respect to the case 12 due to flanges 22A, that are formed at the both ends of the leader pin 22 and project out from the transverse direction end portions of the magnetic tape T, being set within pin receiving recesses 24 that are provided at positions of the case 12 that look out onto the opening 18. A spring 26, that is for maintaining the posture of the leader pin 22 with respect to the case 12 by pushing the flanges 22A against the concave walls of the pin receiving recesses 24, is provided at the case 12. Thin shaft portions of the leader pin 22, that are between the flanges 22A and the recording tape T, are caught by a pull-out member of the drive device, and the leader pin 22 is pulled-out from the case 12 together with the recording tape T.

The opening 18 of the case 12 is opened and closed by a door 28 that serves as an opening/closing member. The door 28 is structured so as to open and close the opening 18 by sliding in the front-back direction while being guided by a guide groove 25 formed along the right side wall 12R that is formed by the outer peripheral wall 14B and the outer peripheral wall 16B. The door 28 is urged in the direction of closing the opening 18 by a door spring 30.

Reel area ribs 32, that serve as standing portions (inner walls) and separating walls and that are provided so as to cover the reel 20 from the radial direction outer side (outer peripheral side), are provided so as to stand at the case 12. The reel area ribs 32 are structured by half portions thereof, that stand from the ceiling plate 14A and the floor plate 16A respectively, being joined together, and are structures that surround a reel space 34 in which the reel 20 is disposed. In the present exemplary embodiment, plural the reel area ribs 32 stand in portions in the round direction, and the respective round direction end portions thereof are connected to the outer peripheral wall 14B, the outer peripheral wall 16B via connecting walls 36. Note that, in order to form the guide groove 25, the connecting wall 36 is not connected to the round direction end portion of the reel area rib 32 positioned in a vicinity of the opening 18, and the screw boss 15 is formed integrally with this round direction end portion in order to ensure the strength thereof.

A reel opening 42 is formed in the substantially central portion of the floor plate 16A of the case 12. The reel opening 42 is for exposing a reel gear 38 and a magnetic metal reel plate 40 that are provided at a floor portion 35A of a reel hub 35 that forms the axially central portion of the reel 20. An unillustrated rotating shaft of a drive device causes a driving gear to mesh together with the reel gear 38 while attracting and holding the reel plate 40 by a magnet, and drives and rotates the reel 20.

The reel 20 has a pair of upper and lower flanges 44, 46 that restrict transverse direction offset of the magnetic tape T that is wound around the outer peripheral surface of the reel hub 35. Namely, the magnetic tape T is wound between the flanges 44, 46. A locking mechanism 48, that is for locking and releasing locking of rotation of the reel 20 with respect to the case 12, is provided within the cylindrical tube portion of the reel hub 35.

The locking mechanism 48 is structured with the main portions thereof being: an engaging gear 50 that faces upward and is provided at the top surface side of the floor portion 35A of the reel hub 35; a braking member 52 having a braking gear 52A that faces downward and can mesh-together with the engaging gear 50; a rotation preventing portion 55 that prohibits rotation of the braking member 52 with respect to the case 12; a lock spring 54 that urges the braking member 52 downward so that the braking gear 52A meshes with the engaging gear 50; and a releasing operation member 56 for pushing the braking member 52 upward against the urging force of the lock spring 54.

The rotation preventing portion 55 is structured by a cross-shaped rib 58, that projects-out from the ceiling plate 14A, being inserted in a cross-shaped groove 60 of the braking member 52 so as to be able to be displaced relatively in the vertical direction. The releasing operation member 56 is disposed between the floor portion 35A and the braking member 52, and is structured so as to, by moving upward, move the braking member 52 toward the upper side and release the meshing-together of the braking gear 52A with the engaging gear 50, i.e., release the rotation locked state of the reel 20.

In the present exemplary embodiment, at the releasing operation member 56, leg portions 56B, that hang downward from respective vertices of a main body 56A that is formed in a substantially triangular shape in plan view, pass through pass-through holes 35B of the floor portion 35A. The leg portions 56B project-out between teeth of the reel gear 38, and are pushed and moved upward by the driving gear of the rotating shaft that meshes together with the reel gear 38. Namely, the locking mechanism 48 is structured such that, accompanying the meshing-together of the reel gear 38 and the driving gear of the drive device, the rotation locked state of the reel 20 with respect to the case 12 is released. The releasing operation member 56 rotates integrally with the reel 20. At a projection 56C, that is provided at the substantially central portion thereof, the releasing operation member 56 slidingly-contacts, with low friction, a spherical projection 52B of the braking member 52 whose rotation with respect to the case 12 is prevented.

The recording tape cartridge 10 has a write protect portion 62 that is for prohibiting writing of information onto the magnetic tape T. The write protect portion 62 is structured such that an erroneous deletion preventing plug 64 is provided so as to be able to be moved, by the operation of a user, between a permitting position at which writing of information onto the magnetic tape T is permitted, and a prohibiting position at which writing of information onto the magnetic tape T is prohibited. In the present exemplary embodiment, the erroneous deletion preventing plug 64 is structured at a rear, left corner portion 12BL of the case 12, and can be placed at the permitting position and the prohibiting position by being moved along a rear wall 12B. The erroneous deletion preventing plug 64 is disposed so as extend over the lower case 16 and the upper case 14, and is guided by a lower guide wall 68, that is provided substantially parallel to the rear wall 12B within the lower case 16, and an upper guide wall 66, that is provided substantially parallel to the rear wall 12B within the upper case 14.

The recording tape cartridge 10 has a memory board M on which is stored various types of individual information for that recording tape cartridge 10 such as, for example, individual identification information of the recording tape cartridge 10, manufacturing information, the recording capacity and the recording format of the magnetic tape T, and the like. The memory board M is disposed at a rear, right corner portion 12BR of the case 12 so as to be inclined to face both rearward and downward. Due thereto, the information of the memory board M can be read from both the bottom surface side and the rear surface side of the case 12. The memory board M is disposed within the lower case 16 (so as to not project-out to the upper case 14 side).

(Structure of RFID Tag)

The above-described recording tape cartridge 10 has a built-in UHF band RFID tag 70 in the case 12. For example, information that was conventionally expressed by a bar code label or the like affixed to the recording tape cartridge 10 and information for centrally managing the individual cartridge at the time of storage or the time of conveying and usage by an autoloader (management that considers the relationship with the contents recorded on the magnetic tape T), is written to and read-out from the UHF band RFID tag 70 (an IC chip 72 that is described below).

Figure 7:
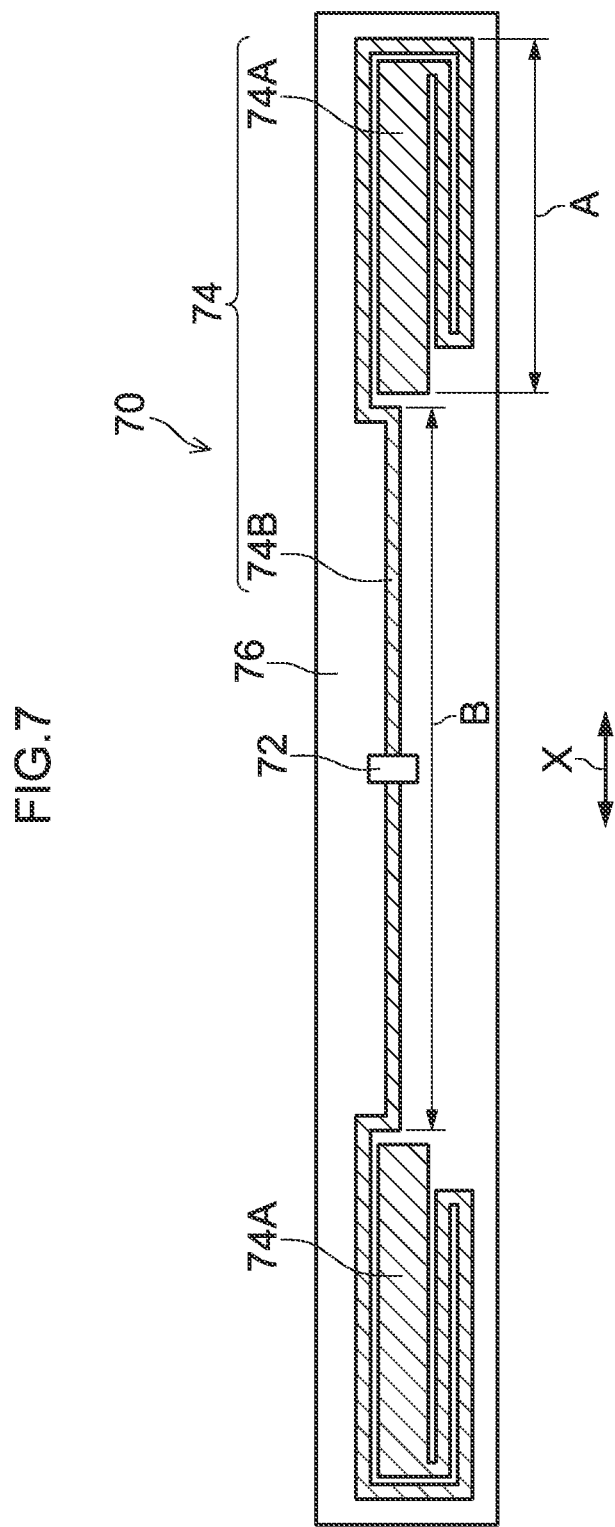
FIG. 7 is a front view showing the UHF band RFID tag that structures the recording tape cartridge relating to the first exemplary embodiment of the present invention.

The schematic overall structure of the UHF band RFID tag (an abbreviation for Radio Frequency IDentification tag, also called RF tag or IC tag) 70 is shown in a front view in FIG. 7. As shown in FIG. 7, the UHF band RFID tag 70 is structured with the main portions thereof being an IC chip 72 serving as an element for communication, a tag antenna 74 serving as an antenna for the IC chip 72 to carry out wireless (non-contact) communication by radio waves of a specific frequency f, and a base sheet 76 serving as a base portion for holding them. Note that, although not illustrated, additional structures may also be employed such as a protective layer for protecting the tag antenna 74, a printing layer on which printing can be carried out, an adhesive layer for adhering these, and the like. The base sheet 76 is formed of a resin material such as, for example, polyethylene terephthalate (PET) or the like.

The tag antenna 74 is formed of an electrically-conductive material such as aluminum, copper, or the like, and is long in a specific direction (the arrow X direction in FIG. 7), and is structured as a type of a so-called dipole antenna that is formed to be symmetrical (so as to have line symmetry) with respect to (a longitudinal direction central line that passes through) the IC chip 72. Although the shape of the tag antenna 74 is described below, the total extended length thereof is determined in accordance with a wavelength λ of the radio waves of the aforementioned specific frequency f (in the present exemplary embodiment, 860 MHz to 960 MHz of the UHF band that is the communication frequency of the UHF band RFID tag 70). Note that, in consideration of the effects of dielectric layers that are the base sheet and structural parts (the rear wall 12B and the reel area ribs 32 of the case 12 made of resin) of the recording tape cartridge 10, the total extended length of the tag antenna 74 is made to be a length that is slightly short with respect to the half-wavelength corresponding to the specific frequency f.

In order to ensure the above-described total extended length, the tag antenna 74 is folded-over plural times in the longitudinal direction so as to form a meander line structure in the longitudinal direction. Concretely, the IC chip 72 is connected to the central portion of the tag antenna 74, and the tag antenna 74 is formed so as to have left-right symmetry with respect to the IC chip 72. Radiating portions 74A, that are substantially rectangular and are formed to be wider than the other portions, are formed at the both ends of the tag antenna 74.

The portion of the tag antenna 74 other than the radiating portions 74A is a power feed portion 74B including the portion to which the IC chip 72 is connected. Due to the power feed portion 74B being folded-over plural times, the total extended length of the tag antenna 74 is ensured within the dimensions of the base sheet 76. In the present exemplary embodiment, portions of the power feed portion 74B are formed so as to surround the radiating portions 74A. Note that, for example, the portions of the tag antenna 74 that include the ranges at which the radiating portions 74A are formed in the longitudinal direction of the base sheet 76 (region A shown in FIG. 7) may be considered to be the radiating portions, and the other portions may be considered to be the power feed portion. Or, for example, the central portion (region B shown in FIG. 7) that includes the connection region of the IC chip 72 may be considered to be the power feed portion, and the other portions may be considered to be radiating portions. Further, at the central portion in the longitudinal direction of the tag antenna 74, a loop coil portion may be formed so as to include the connection portion of the IC chip 72.

At the above-described UHF band RFID tag 70, the total height of the tag antenna 74 is around 7 to 8 mm, and the total height of the base sheet 76 is around 9 to 10 mm. These dimensions are set as dimensions that can be accommodated at the upper case 14 or the lower case 16 of the case 12 that houses the reel 20 around which the magnetic tape T of a width of 12.65 mm is wound. In the present exemplary embodiment, as is described below, the UHF band RFID tag 70 is accommodated in the upper case 14. Note that the UHF band RFID tag 70 may be accommodated in the lower case 16, or may be accommodated in both the upper case 14 and the lower case 16.

Further, the UHF band RFID tag 70 (the base sheet 76) in the present exemplary embodiment is formed so as to be curved in plan view. Namely, by, for example, structuring the base sheet 76 by laminating together materials (films or the like) having different shrinkage rates and heating the laminated materials, the UHF band RFID tag 70 is structured so as to exhibit the function of a plate spring that, when elastically deformed to a flat state, attempts to return to a curved state.

(Case Structure of Built-in RFID Tag)

Figure 4:
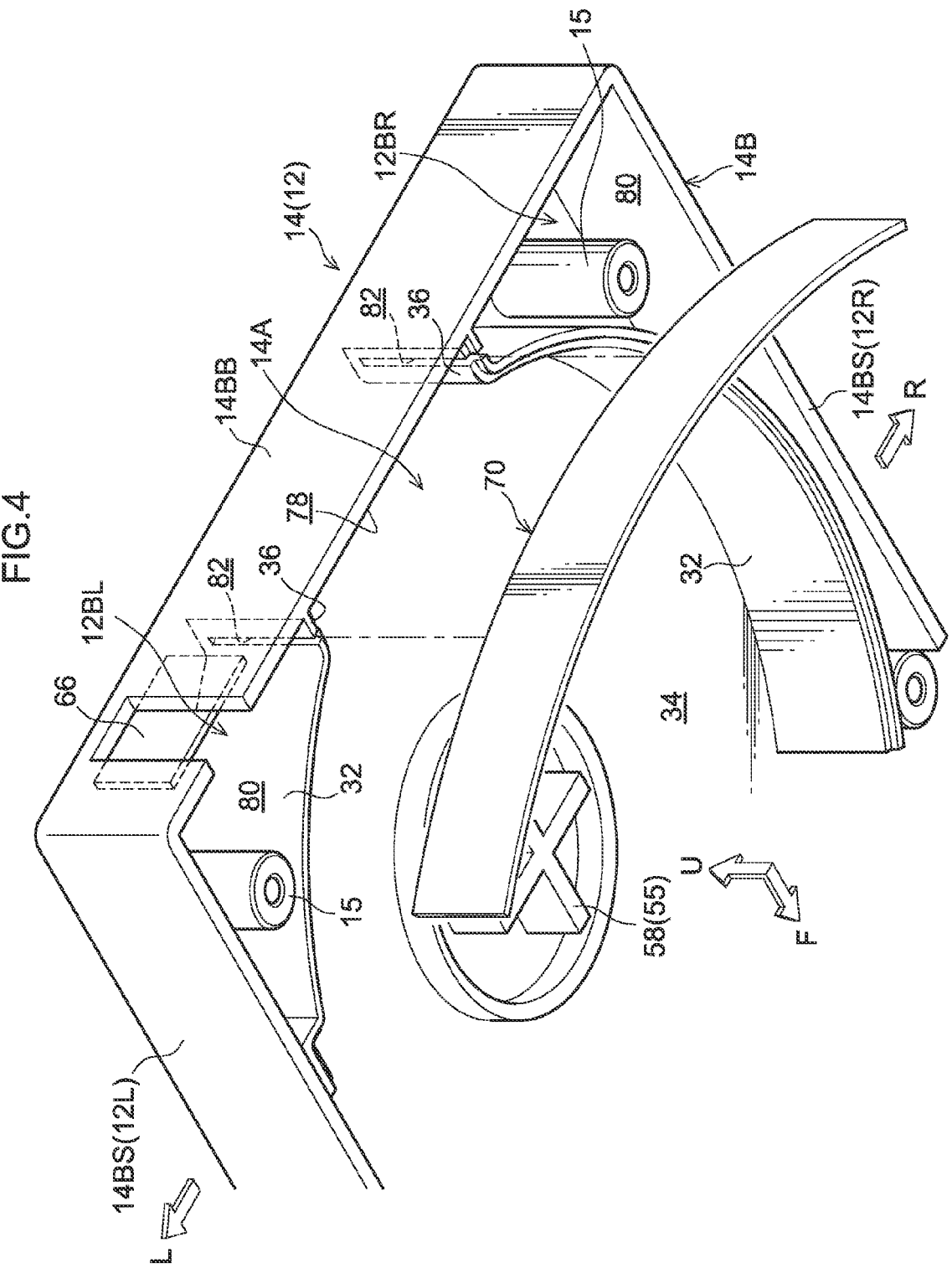
FIG. 4 is a perspective view showing a structure for mounting a UHF band RFID tag to an upper case that structures the recording tape cartridge relating to the first exemplary embodiment of the present invention.
Figure 5:
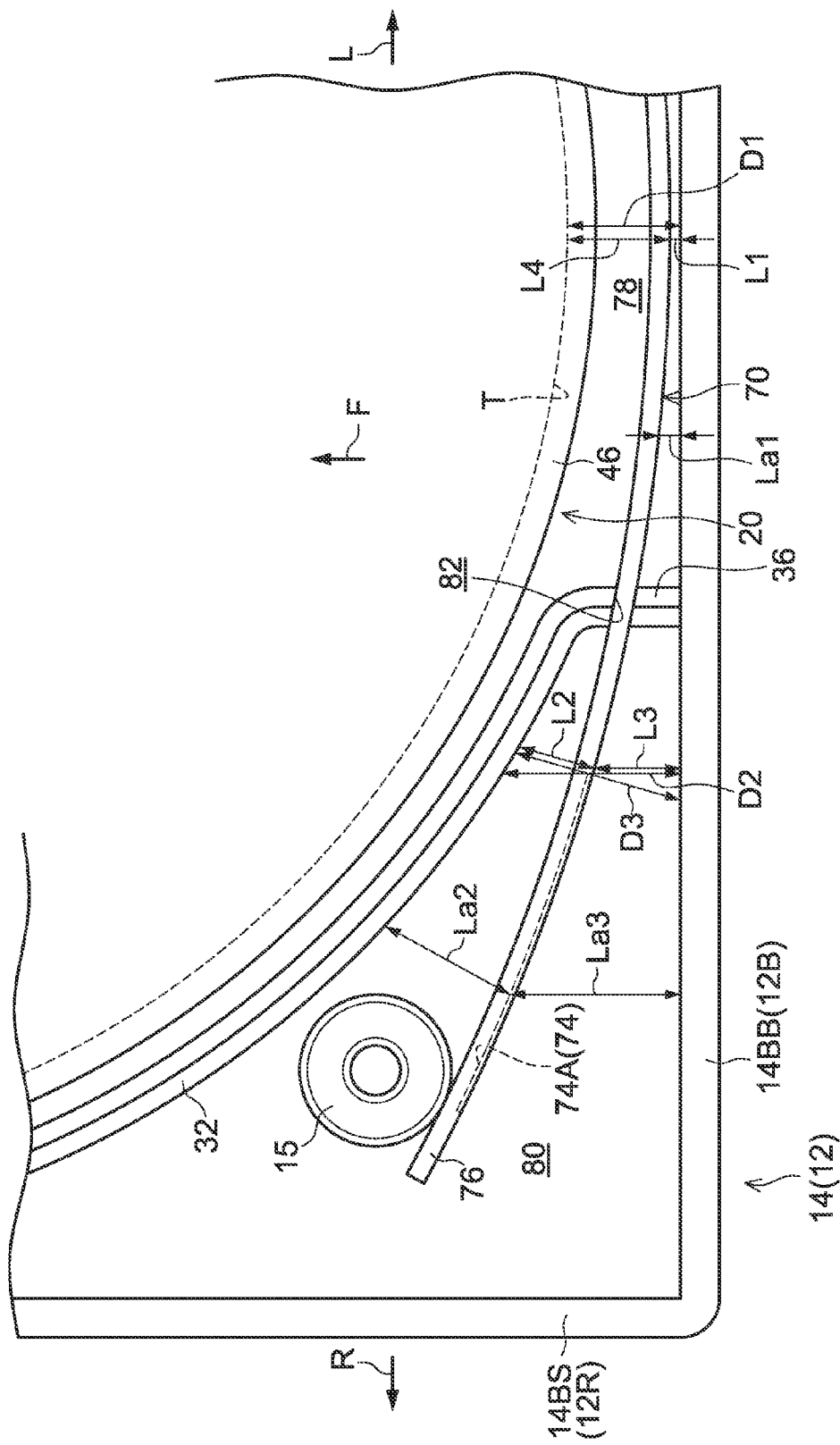
FIG. 5 is a bottom view showing a state in which the UHF band RFID tag is mounted to the upper case that structures the recording tape cartridge relating to the first exemplary embodiment of the present invention.

As shown in FIG. 1 and FIG. 4, the UHF band RFID tag 70 is housed at the rear portion of the upper case 14. As shown in FIG. 5, the regions of the UHF band RFID tag 70 at which the respective radiating portions 74A are set are housed in the case 12 at any of the corner portions that are adjacent to one another in the round direction among the four corners of the case 12, that are spaces at the outer side of the reel space 34. In the present exemplary embodiment, the UHF band RFID tag 70 is, overall, accommodated in a power feed portion space 78 and radiating portion spaces 80 that are disposed at the rear of the reel space 34. Note that, in the following description, there are cases in which the region of the UHF band RFID tag 70 at which the radiating portion 74A is set is simply called the radiating portion 74A.

Figure 6:
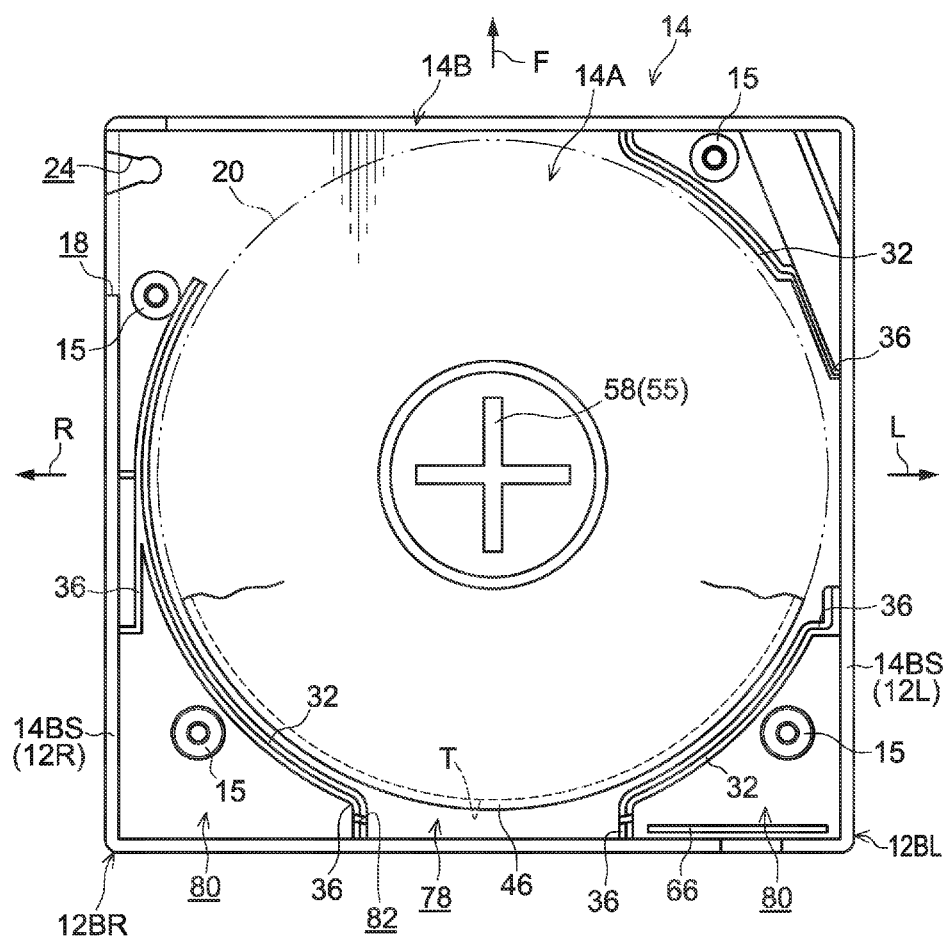
FIG. 6 is a bottom view showing the upper case that structures the recording tape cartridge relating to the first exemplary embodiment of the present invention.

As shown in FIG. 6 as well, the power feed portion space 78 in the present exemplary embodiment is a space formed between the reel 20 (the outermost peripheral portion of the magnetic tape T) that is disposed in the reel space 34, and a rear upper wall 14BB that is the portion at the outer peripheral wall 14B of the upper case 14 which portion structures the rear wall 12B. To further describe this point, in the present exemplary embodiment, although no physical boundary portion (structural portion of the case 12) exists between the reel space 34 and the power feed portion space 78, in such a structure, the outermost peripheral portion of the magnetic tape T is considered to be the boundary portion that structures the power feed portion space 78, instead of a structural portion of the case 12. In other words, the outermost surface of the magnetic tape T, that is a dielectric that faces the power feed portion 74B, is considered to be the boundary portion between the power feed portion space 78 and the magnetic tape T that is a portion other than the power feed portion space 78.

The radiating portion spaces 80 are disposed in spaces that are surrounded by the reel area ribs 32, the connecting walls 36, the rear upper wall 14BB, and upper side walls 14BS that form the left and right side walls (the right side wall 12R and a left side wall 12L) of the case 12 at the outer peripheral wall 14B.

More concretely, the radiating portion space 80, that is at the right side (the side at which the memory board M is disposed) and that is located at the corner portion 12BR of the case 12, is a space that is surrounded by the reel area rib 32, the connecting wall 36, the rear upper wall 14BB, and the upper side wall 14BS. At the radiating portion space 80 at the right side, the reel area rib 32 and the rear upper wall 14BB are the walls that serve as the boundary portions that structure (prescribe at least a portion of the peripheral edge of) the radiating portion space in the present invention (the reel area rib 32 and the rear upper wall 14BB can also be considered to be walls that surround the radiating portion space or walls that sandwich the radiating portion space). Concretely, the reel area rib 32 forms a boundary portion that partitions the radiating portion space 80 and the reel area 34, and the rear upper wall 14BB forms a boundary portion that partitions the radiating portion space 80 and the space at the exterior of the case 12. Further, the surface of the reel area rib 32 at the radiating portion space 80 side (facing the radiating portion 74A), the surface of the rear upper wall 14BB at the radiating portion space 80 side may be considered to be boundary portions between the radiating portion space 80 and the reel area rib 32 itself (a solid portion that is a dielectric), the rear upper wall 14BB itself (a solid portion that is a dielectric), that are portions that are not the radiating portion space 80.

On the other hand, the radiating portion space 80, that is at the left side (the side at which erroneous deletion preventing plug 64 is disposed) and that is located at the corner portion 12BL of the case 12, is a space that is surrounded by the reel area rib 32 (a standing portion), the connecting wall 36 (a standing portion), the upper guide wall 66 (a standing portion), and the upper side wall 14BS. Namely, the radiating portion space 80 at the left side can be considered to be a space that is sandwiched (surrounded) in the thickness direction of the UHF band RFID tag 70 by respective standing portions that are formed within the case 12. In other words, at the radiating portion space 80 at the left side, the reel area rib 32 and the upper guide wall 66 are walls that serve as boundary portions that structure (prescribe at least a portion of the peripheral edge of) the radiating portion space in the present invention (the reel area rib 32 and the upper guide wall 66 can also be considered to be walls that surround the radiating portion space or walls that sandwich the radiating portion space). Concretely, the reel area rib 32 forms a boundary portion that partitions the radiating portion space 80 and the reel area 34, and the upper guide wall 66 forms a boundary portion that partitions the space, between the upper guide wall 66 and the rear upper wall 14BB, from the radiating portion space 80. Further, the surface of the reel area rib 32 at the radiating portion space 80 side (facing the radiating portion 74A), the surface of the upper guide wall 66 at the radiating portion space 80 side may be considered to be boundary portions between the radiating portion space 80 and the reel area rib 32 itself (a solid portion that is a dielectric), the upper guide wall 66 itself (a solid portion that is a dielectric), that are portions that are not the radiating portion space 80.

The radiating portion space 80, in which is disposed the entire radiating portion 74A of the tag antenna 74 structuring the UHF band RFID tag 70, is a space that is wider than the power feed portion space 78 in which is disposed at least the region of the power feed portion 74B to which the IC chip 72 is connected. Concretely, as shown in FIG. 5, given that the minimum clearance in the front-back direction (the thickness direction of the power feed portion 74B, the rear upper wall 14BB) between the outermost peripheral portion of the magnetic tape T and the rear upper wall 14BB that is a wall that structures the power feed portion space 78 is D1, and the minimum clearance along the front-back direction between the rear upper wall 14BB and the reel area rib 32 that sandwich the radiating portion 74A is D2, and the minimum clearance along the thickness direction of the radiating portion 74A between the reel area rib 32 and the rear upper wall 14BB is D3, D2>D1 and D3>D1. Note that, in FIG. 5, only 74A of the tag antenna 74 is shown by the dashed line.

The UHF band RFID tag 70 is housed within the upper case 14 such that the left and right radiating portions 74A are positioned at the substantially central portions, in the front-back direction, of the radiating portion spaces 80. Concretely, cut-out portions 82, into which the UHF band RFID tag 70 is placed, are formed in the connecting walls 36 that are positioned between the power feed portion space 78 and the radiating portion spaces 80 at the upper case 14. By placing the portion of the UHF band RFID tag 70, which portion is between the left and right radiating portions 74A, in the cut-out portions 82, the both end sides including the ranges at which the radiating portions 74A are set are accommodated in the radiating portion spaces 80, and the central portion is accommodated in the power feed portion space 78.

In the present exemplary embodiment, in the state in which the UHF band RFID tag 70, that is formed to be curved as described above, is elastically deformed in the direction of making the curvature small, the both ends contact the screw bosses 15 such that restoring is restricted. This is a structure in which the UHF band RFID tag 70 is held at the upper case 14 by the restoring force of the UHF band RFID tag 70 itself. In this state, the UHF band RFID tag 70 engages with the rear-side edge portions of the cut-out portions 82. Therefore, the front-side edge portions of the cut-out portions 82 may be made to be inclined surfaces that are inclined so as to guide (lead-in) the UHF band RFID tag 70. Note that, in the state in which the lower case 16 is joined to the upper case 14, movement of the UHF band RFID tag 70 toward the lower case 16 side is restricted by the connecting walls 36 of the lower case 16 (walls that abut the connecting walls 36 in which the cut-out portions 82 are formed).

In the state in which the UHF band RFID tag 70 is held in the upper case 14 (the case 12), the central portion of the power feed portion 74B (the region to which the IC chip 72 is connected) contacts the rear upper wall 14BB or is in very close proximity to the rear upper wall 14BB. Namely, the UHF band RFID tag 70 can be considered to be a member that is supported at the upper case 14 such that (the set range of) the power feed portion 74B contacts the rear upper wall 14BB. In the present exemplary embodiment, a distance L1 between the range at which the power feed portion 74B is set at the UHF band RFID tag 70, and the rear upper wall 14BB that is the wall that is nearest among the walls that structure the power feed portion space 78, is made to be around 0 to 1 mm.

On the other hand, given that the shortest distances between the range at which the radiating portion 74A is set at the UHF band RFID tag 70 and the reel area rib 32, the rear upper wall 14BB are L2, L3, L2≈L3, and L2, L3>2 mm. Therefore, at the recording tape cartridge 10, L2>L1, and L3>L1. Namely, the shortest distance from the radiating portion 74A to the wall that is nearest among the walls that structure the radiating portion space 80 is set to be greater than the aforementioned distance L1.

As described above, D2, D3, that are the clearances between the walls of the radiating portion space 80 that are positioned at both sides so as to sandwich the radiating portion 74A, are greater than D1 that is the clearance between the walls of the power feed portion space 78 that are positioned at both sides so as to sandwich the power feed portion 74B. Therefore, considering that only the thickness of the UHF band RFID tag 70 is sufficiently small, L2+L3>D1. The sum (L2+L3) of the distances from the radiating portion 74A to the reel area rib 32, the rear upper wall 14BB that are the walls at the both sides thereof, is thereby set to be larger than the sum (L1+L4≈D1) of the distances from the power feed portion 74B to the outermost peripheral portion of the magnetic tape T, the rear upper wall 14BB that are the walls at the both sides thereof.

Further, from the relationships of the above-described shortest distances and clearances, at the recording tape cartridge 10, an average distance La2 from the radiating portion 74A to the rear upper wall 14BB over the range at which the radiating portion 74A is set, and an average distance La3 from that radiating portion 74A to the reel area rib 32, are respectively made to be greater than an average distance La1 from the power feed portion 74B to the rear upper wall 14BB. In the present exemplary embodiment, the respective average distances La2, La3 to the rear upper wall 14BB, the reel area rib 32 over the range at which the radiating portion 74A is set, are respectively set to be greater than or equal to 4 mm. These average distances are realized by, as described above, placing the range in which the radiating portion 74A is set at the UHF band RFID tag 70 at the substantially central portion in the front-back direction of the radiating portion space 80 (i.e., by making La1≈La2).

Further, at the recording tape cartridge 10, the range in which the radiating portion 74A is set at the UHF band RFID tag 70 is set either so as to not contact the screw boss 15, or such that the contact width is less than or equal to 2 mm. In a case in which the set range of the radiating portion 74A does not contact the screw boss 15, the distance between (the longitudinal direction end portion of) the tag antenna 74 and the contact region of the screw boss 15 at the UHF band RFID tag 70 is preferably greater than or equal to 2 mm, and more preferably greater than or equal to 4 mm. On the other hand, in a structure in which the radiating portion 74A at the UHF band RFID tag 70 contacts the screw boss 15, because the peripheral surface of the screw boss 15 in the present exemplary embodiment is a cylindrical surface, a structure in which the contact width is 2 mm is realized. Here, the screw boss 15 in the present exemplary embodiment can be considered to be a boundary portion that structures (prescribes a portion of the peripheral edge of) the radiating portion space 80. In other words, the surface of the screw boss 15 can be considered to be a boundary portion between the radiating portion space 80 and the screw boss 15 itself (the solid portion or the screw hole portion that is a dielectric) that is a portion that is not the radiating portion space 80.

The arrangement of the radiating portion 74A at one side (the right side) has been described above, and the arrangement of the radiating portion 74A at the opposite side (the left side) is structured similarly. Here, although not illustrated, at the radiating portion space 80 at the left side, the upper guide wall 66 is a wall that forms the boundary portion at the rear side. Therefore, the aforementioned clearances D2, D3, shortest distance L3, and average distance La3, that are based on the upper guide wall 66, satisfy the above-described relationships.

The radiating portion 74A is separated also from the ceiling plate 14A of the case 12 by greater than or equal to 2 mm in the vertical direction, and, in the present exemplary embodiment, is separated by greater than or equal to 4 mm. Namely, in recording tape cartridge 10, the distance to the ceiling plate 14A, that is a dielectric that is positioned in the direction along the formed surface of the radiating portion 74A, is set to be greater than or equal to 2 mm as a preferred form, and greater than or equal to 4 mm as a more preferred form, and not only in the direction facing the radiating portion 74A (the main communication direction). Because the UHF band RFID tag 70 is held at the upper case 14 as described above, the radiating portion 74A is of course separated from the floor plate 16A by greater than or equal to 4 mm.

Operation of the present exemplary embodiment is described next.

At the recording tape cartridge 10 of the above-described structure, when information is to be written onto the magnetic tape T, or in a case in which information written on the magnetic tape T is to be read-out, the recording tape cartridge 10 is loaded into a drive device. Accompanying this loading operation, the opening 18 is opened, the driving gear of the rotating shaft meshes together with the reel gear 38 of the reel 20, and the locking of rotation of the reel 20 is released. When the drive device pulls-out the magnetic tape T with the leader pin 22 leading and sets the leader pin 22 at the reel of the drive device, writing or reading of information with respect to the magnetic tape T is carried out by a head provided on a tape path, while the reel and the reel 20 are driven and rotated synchronously.

On the other hand, after writing or reading-out of information with respect to the magnetic tape T is finished, the reel 20 is rotated reversely and the magnetic tape T is taken-up onto the reel 20, and then the leader pin 22 is held in the pin receiving recesses 24. Accompanying the operation of the recording tape cartridge 10 being ejected from the drive device, rotation of the reel 20 with respect to the case 12 is locked by the braking member 52, and the opening 18 is closed by the door 28.

At the recording tape cartridge 10, reading and writing of information are carried out with respect to the built-in UHF band RFID tag 70 by an unillustrated reader/writer that is set adjacent to the exterior of the case 12.

Here, at the recording tape cartridge 10, at least a portion of the range at which the radiating portion 74A is set at the UHF band RFID tag 70 does not contact structural portions of the case 12 (the reel area rib 32, the rear upper wall 14BB, the screw boss 15). Therefore, the UHF band RFID tag 70 is not affected by the permittivity of the case 12.

Figure 8:
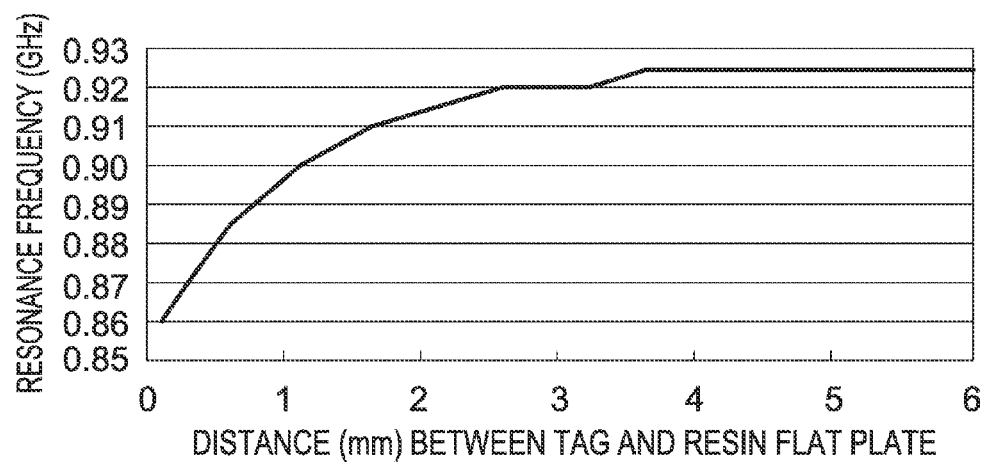
FIG. 8 is a graph showing results of a first simulation for explaining effects, on communication frequency, of the relative positions of a wall portion of a case that structures the recording tape cartridge relating to the first exemplary embodiment of the present invention and an radiating portion of the UHF band RFID tag.

This point will be supplementarily described with reference to FIG. 8 through FIG. 13. FIG. 8 shows the results of simulation of the relationship between the distance between the UHF band RFID tag 70 and a resin flat plate (corresponding to the reel area rib 32 or the rear upper wall 14BB), and the resonance frequency of the tag antenna 74. The conditions of the simulation are that a single resin flat plate, that is sufficiently large with respect to the UHF band RFID tag 70 and has a thickness of 1.1 mm and a relative permittivity of 2.55, is made to approach and move away from the surface of the UHF band RFID tag 70 at the side at which the tag antenna 74 is formed, in a direction orthogonal to the surface (while the resin flat plate and the surface of the UHF band RFID tag 70 are maintained parallel). The resonance frequency of the tag antenna 74 at respective distances (positions) between the resin flat plate and the UHF band RFID tag 70 is determined by numerical calculation. From FIG. 8, it can be understood that, when a distance L between the UHF band RFID tag 70 and the resin flat plate is small, the resonance frequency (frequency at which communication is possible) is low. Further, it can be understood that, when the distance L drops below 2 mm, the rate of change in the resonance frequency increases. Moreover, it was confirmed that, in a case in which the distance L is greater than or equal to 3 mm, the required resonance frequency (greater than or equal to 0.92 GHz in this simulation example) is obtained.

Figure 9:
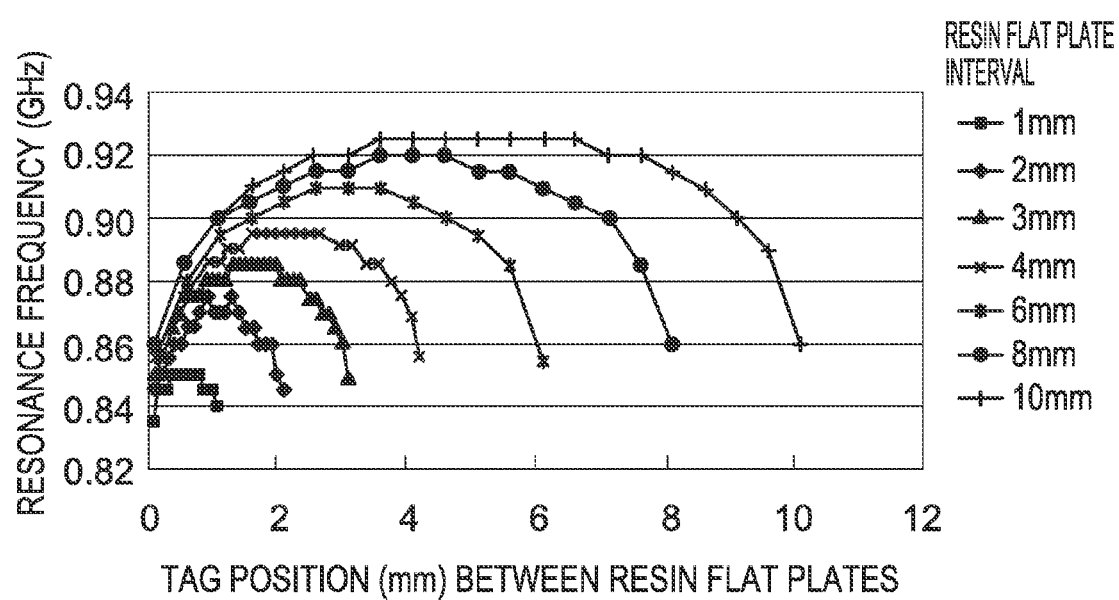
FIG. 9 is a graph showing results of a second simulation for explaining effects, on the communication frequency, of the relative positions of wall portions of the case that structures the recording tape cartridge relating to the first exemplary embodiment of the present invention and the radiating portion of the UHF band RFID tag.
Figure 10:
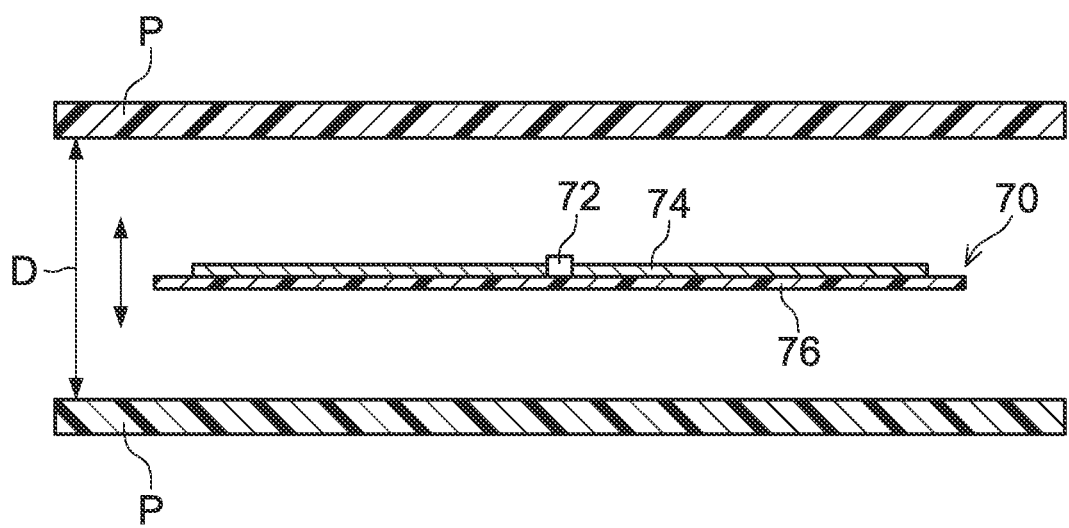
FIG. 10 is a schematic drawing for explaining conditions of the simulation of FIG. 9.

FIG. 9 shows the results of simulation of the relationship between the position of the UHF band RFID tag 70 between a pair of resin flat plates that are disposed parallel, and the resonance frequency of the tag antenna 74. The conditions of the simulation are that, between a pair of resin flat plates that are sufficient large with respect to the UHF band RFID tag 70 and have a thickness of 1.1 mm and a relative permittivity of 2.55, the UHF band RFID tag 70 is moved while remaining parallel to these flat plates P, as shown in FIG. 10. From FIG. 9, it can be understood that, when a clearance D between the resin flat plates is small, the resonance frequency (frequency at which communication is possible) is low as compared with a case in which the clearance D is large. Further, it can be understood that, in a case of the same clearance D between the flat plates, when the distance between the UHF band RFID tag 70 and either of the flat plates P is small (the difference in the distances between the UHF band RFID tag 70 and the respective flat plates is large), the resonance frequency (frequency at which communication is possible) is low as compared with a case in which the UHF band RFID tag 70 is positioned at the central portion between the flat plates.

Further, from FIG. 9, it was confirmed that, in a case in which the clearance between the flat plates is greater than or equal to 8 mm and the distance between the UHF band RFID tag 70 and each of the flat plates is greater than or equal to substantially 3.5 mm, the needed resonance frequency (greater than or equal to 0.92 GHz) is obtained. Because simulation is carried out with the UHF band RFID tag 70 and the respective flat plates being disposed in parallel, this distance of greater than or equal to 3.5 mm can be interpreted as being the average distance between the resin flat plate and the tag antenna 74 (the radiating portion 74A).

Figure 11A:
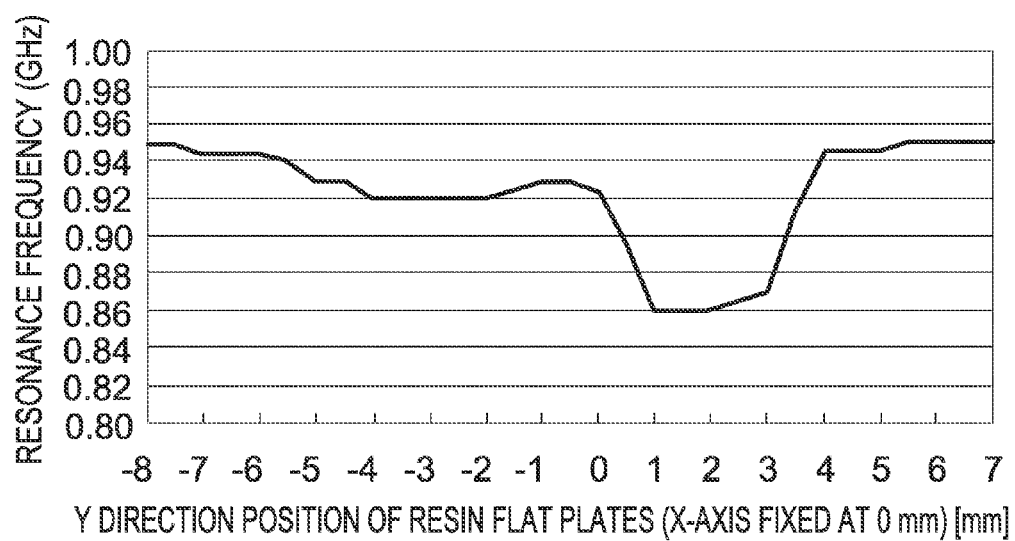
FIG. 11A is a drawing showing results of a third simulation for explaining effects, on the communication frequency, of the relative positions of wall portions of the case that structures the recording tape cartridge relating to the first exemplary embodiment of the present invention and the radiating portions of the UHF band RFID tag, and is a graph showing results in a case in which resin panels are relatively displaced in a Y direction with respect to the radiating portions of the UHF band RFID tag.
Figure 11B:
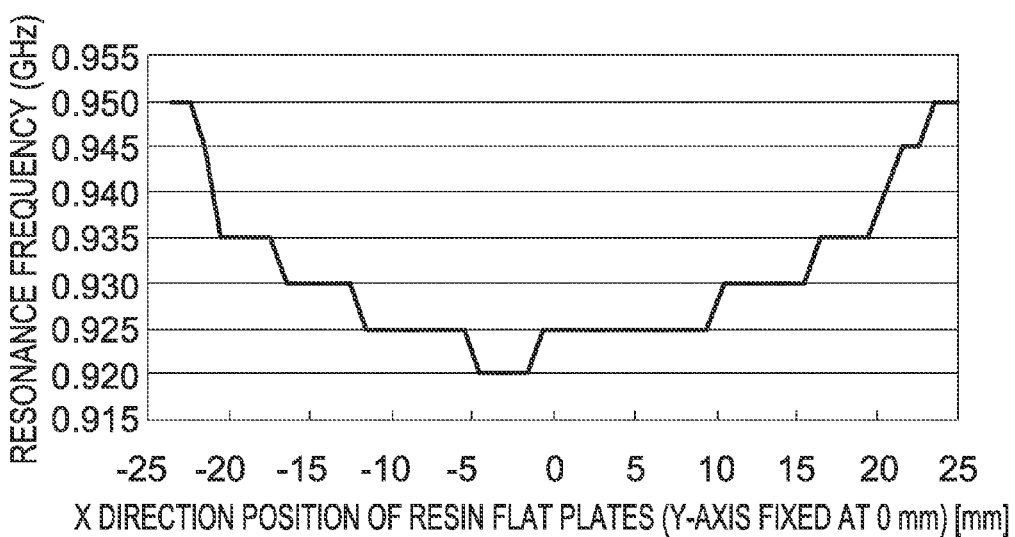
FIG. 11B is a drawing showing results of the third simulation for explaining effects, on the communication frequency, of the relative positions of the wall portions of the case that structures the recording tape cartridge relating to the first exemplary embodiment of the present invention and the radiating portions of the UHF band RFID tag, and is a graph showing results in a case in which the resin panels are relatively displaced in an X direction with respect to the radiating portions of the UHF band RFID tag.

FIG. 11A and FIG. 11B show the results of simulation for specifying regions at the tag antenna 74 that are easily affected by the resin flat plates. In this simulation, a state in which a pair of resin flat plates Pr, that have the same dimensions (width 3.5 mm and length 21.5 mm) as the radiating portions 74A and have a thickness of 1.0 mm and a relative permittivity of 2.55, overlap the radiating portions 74A overall as shown in FIG. 12A is considered to be the origin (X=0, Y=0). The resin flat plates Pr are moved from this origin in the X direction and the Y direction, and the resonance frequency of the tag antenna 74 is computed. FIG. 11A shows the resonance frequency in a case in which the resin flat plates Pr are moved in the Y direction with X=0 as is, and FIG. 11B shows the resonance frequency in a case in which the resin flat plates Pr are moved in the X direction with Y=0 as is. Note that the X+ direction is the direction in which the pair of resin flat plates Pr move apart in the X direction, and the X− direction is the direction in which the pair of resin flat plates Pr approach one another in the X direction. FIG. 12B shows, as an example, a state in which the resin flat plates Pr are displaced in the X− direction.

From FIG. 11A, it can be understood that the resonance frequency decreases the most (the effects of the permittivity of the resin flat plates Pr are large) at the position where the resin flat plates Pr are displaced approximately 2 mm in the Y+ direction from the origin. Namely, it can be understood that, in a case in which the resin flat plates Pr overlap and contact one edge portions (Y+ side edge portions 74C) along the longitudinal directions of the radiating portions 74A, the effects of the permittivity of the resin flat plates Pr are large.

Further, from FIG. 11B, it can be understood that the resonance frequency decreases the most (the effects of the permittivity of the resin flat plates Pr are large) at positions where the resin flat plates Pr are displaced approximately 2 to 4 mm in the X− direction from the origin. Namely, it can be understood that, in a case in which the resin flat plates Pr overlap and contact one edge portions (edge portions 74D that face the IC chip 72 side that is the X− side) along the short-side directions of the radiating portions 74A, the effects of the permittivity of the resin flat plates Pr are large.

Figure 13:
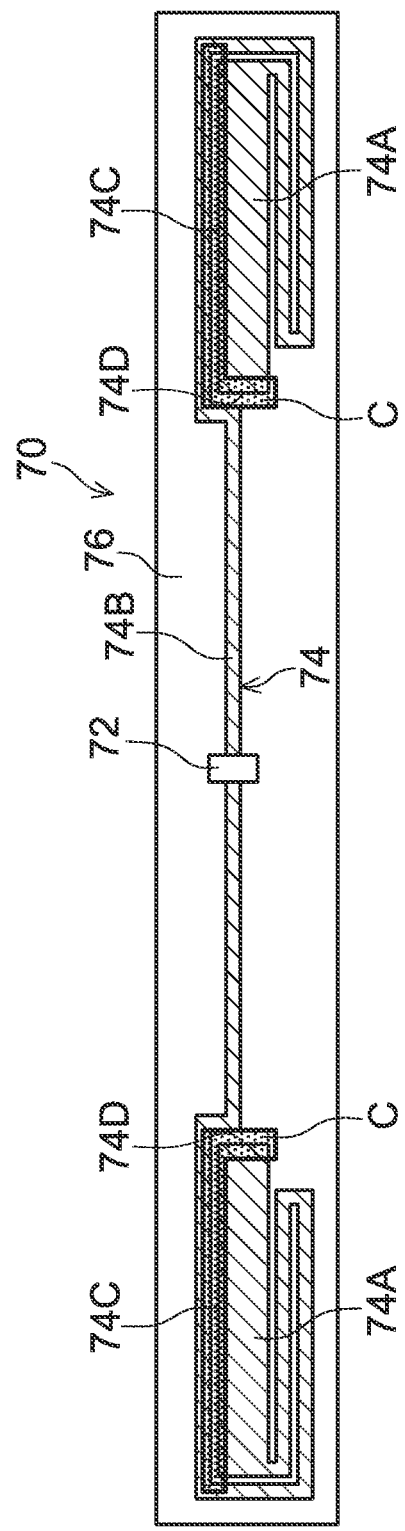
FIG. 13 is a front view showing portions, at the radiating portions of the UHF band RFID tag that structures the recording tape cartridge relating to the first exemplary embodiment of the present invention, which portions are easily affected by the permittivity of the resin panels.

From the results of the above-described respective simulations, it can be understood that it is easy for the tag antenna 74 to be affected by the permittivity of structural parts of the case 12 in a case in which the resin flat plates, i.e., structural parts of the case 12, are adjacent to and overlap, in particular, regions C shown in FIG. 13 at the radiating portions 74A. On the other hand, it can be understood that the tag antenna 74 is not influenced by the permittivity of the resin flat plates Pr that are adjacent to the power feed portion 74B. Note that the portion (the position and shape and the like) of the tag antenna 74 that is easily affected by the permittivity differs in accordance with the shapes of the radiating portions 74A and the power feed portion 74B. However, the point that, regardless of the shapes thereof, the tag antenna 74 is more easily affected by the resin flat plates Pr at the radiating portions than at the power feed portion, is confirmed by a separate simulation.

Here, at the UHF band RFID tag 70 that structures the recording tape cartridge 10, as described above, the radiating portions 74A are apart from both the reel area ribs 32, the rear upper wall 14BB. Therefore, the tag antenna 74 is not influenced by the permittivity of the reel area ribs 32, the rear upper wall 14BB that are disposed so as to overlap (face) the radiating portions 74A as seen from the thickness direction of the reel area ribs 32, the rear upper wall 14BB or the UHF band RFID tag 70.

Further, at the recording tape cartridge 10, the tag antenna 74 and structural portions of the case 12 are separated from one another at a shortest distance of greater than or equal to 2 mm and an average distance of greater than or equal to 4 mm. Therefore, from the results shown in FIG. 8 and FIG. 9, it is the tag antenna 74 is much less influenced by the permittivity of the reel area ribs 32, the rear upper wall 14BB that are disposed so as to overlap (face) the radiating portions 74A.

On the other hand, because the power feed portion 74B is not influenced by the rear upper wall 14BB and the like, limitations on the built-in UHF band RFID tag 70 of the case 12, in which space is limited, do not arise. Therefore, in the recording tape cartridge 10, the space within the case 12 is utilized effectively, and the pair of radiating portions 74A are disposed in the radiating portion spaces 80 that are respectively formed at the corner portions 12BL, 12BR that are adjacent to one another in the round direction of the case 12 (that are not on a diagonal). A structure, that ensures a shortest distance of 2 mm or more and an average distance of 4 mm or more between the radiating portions 74A and the reel area ribs 32, the rear upper wall 14BB, is realized. In particular, in the recording tape cartridge 10, the power feed portion 74B contacts or is in very close proximity to the rear upper wall 14BB, and the UHF band RFID tag 70 can be disposed (built-in) by utilizing the internal space of the case 12 even more effectively.

Note that, also in a structure in which the radiating portions 74A contact the screw bosses 15, because the contact width of the radiating portions 74A and the screw bosses 15 is less than or equal to 2 mm, the tag antenna 74 is not influenced by the permittivity of the screw bosses 15. Further, because the screw bosses 15 are apart at the edge portion sides that are opposite the edge portions 74D that are at the IC chip 72 sides of the radiating portions 74A, the tag antenna 74 is much less influenced by the permittivity of the screw bosses 15. There are also cases in which surface of the tag antenna should contact the screw bosses 15 is considered while taking into consideration the distance between the screw bosses 15 and the tag antenna 74 with the antenna base material (PET), a protective layer, a printing layer, or the like disposed therebetween.

On the other hand, if the radiating portions 74A of the UHF band RFID tag 70 are held at the power feed portion space 78, the distance between the radiating portions 74A and the case 12 (the rear upper wall 14BB, the outermost peripheral portion of the magnetic tape T that structure the power feed portion space 78) becomes closer. Namely, the radiating portions 74A of the tag antenna 74 are easily affected by the permittivity of the case 12 (the rear upper wall 14BB, the outermost peripheral portion of the magnetic tape T that structure the power feed portion space 78). In contrast, in the recording tape cartridge 10, because effects of the materials (permittivity) of the case 12 are suppressed as described above, the degrees of freedom in designing the tag antenna 74 increase. Due thereto, as compared with a structure in which the tag antenna 74 is easily affected by the materials (permittivity) of the case 12, the tag antenna 74 can be made to be larger, which contributes to maintaining or enlarging the resonance frequency band width and to maintaining or improving the radiating efficiency. Further, by widening the resonance frequency band width of the tag antenna 74 to substantially the entire UHF band (860 MHz to 960 MHz), communication in respective countries and geographical regions in which the recording tape cartridge 10 is used becomes possible, and standardization of types of the recording tape cartridges 10 that contain the UHF band RFID tag 70 is aimed for.

The setting of the radiating portions 74A into the case 12 will be described in further detail. It is preferable that the radiating portions 74A be disposed at portions at which sufficiently wide spaces within the case 12 can be ensured. In the present exemplary embodiment, in order to show that the radiating portion spaces 80, in which the radiating portions 74A are to be disposed, are sufficiently wide spaces within the case 12, the distinction between the radiating portion spaces 80 and the power feed portion space 78, in which the power feed portion 74B is to be disposed, is carried out on the basis of the difference in the sizes of the spaces. In other words, the sizes of the radiating portion spaces 80 are prescribed on the basis of the size of the power feed portion space 78. In the case 12 that is square or rectangular in plan view and that houses the reel 20 that is circular in plan view, for example, the corner portions of the case 12 are preferred as sufficiently wide spaces. On the other hand, although the position at which the power feed portion 74B is disposed is not particularly limited, in the case 12 that is square or rectangular in plan view and that houses the reel 20 that is circular in plan view, the pair of radiating portions 74A can be disposed in the corner portions (the corner portions 12BR, 12BL) that are relatively wide spaces, by making the relatively narrow space between the corner portion and the corner portion be the position at which the power feed portion is disposed.

Second Exemplary Embodiment

Figure 14:
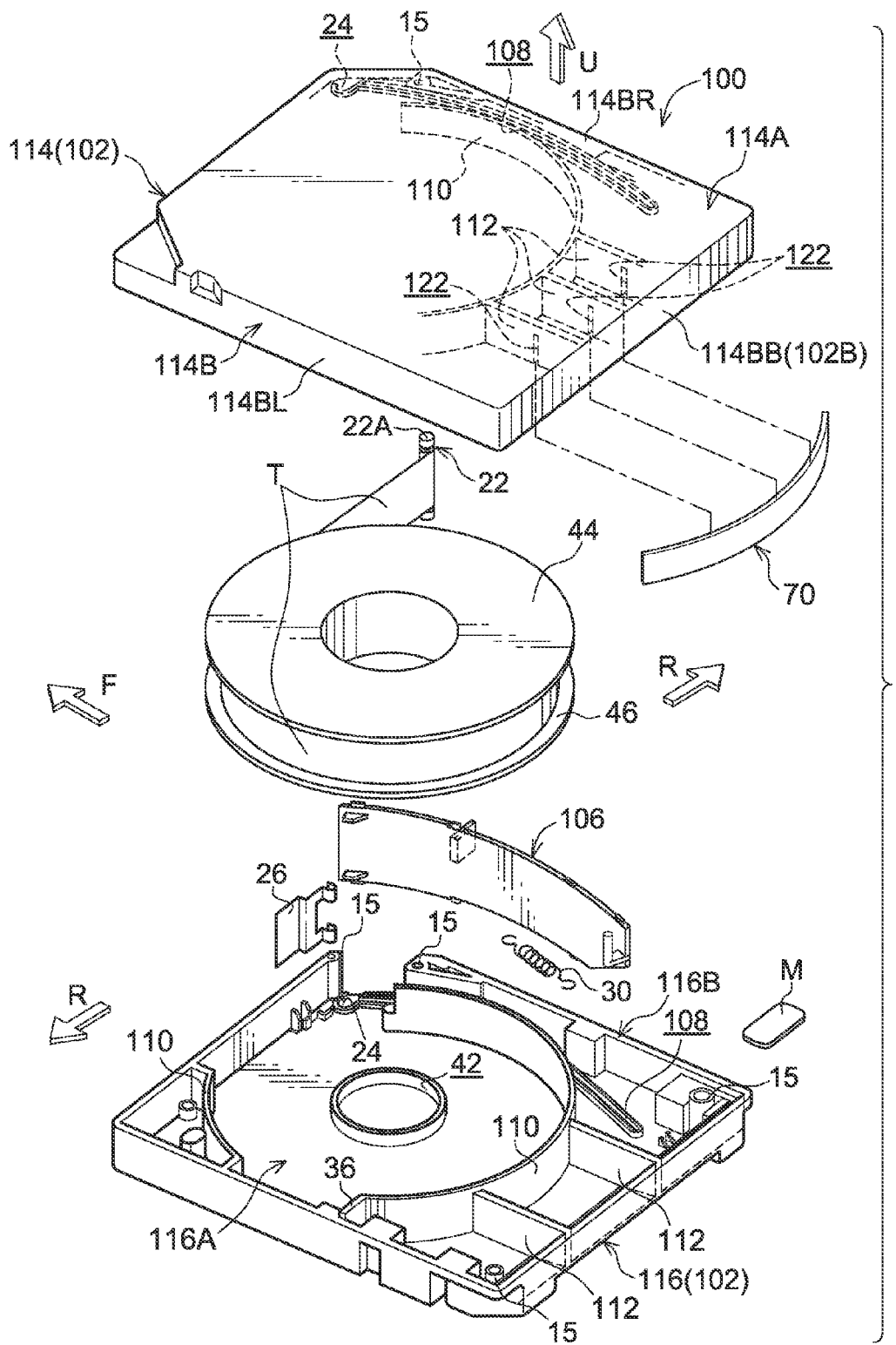
FIG. 14 is an exploded perspective view of a recording tape cartridge relating to a second exemplary embodiment of the present invention seen from above.
Figure 15:
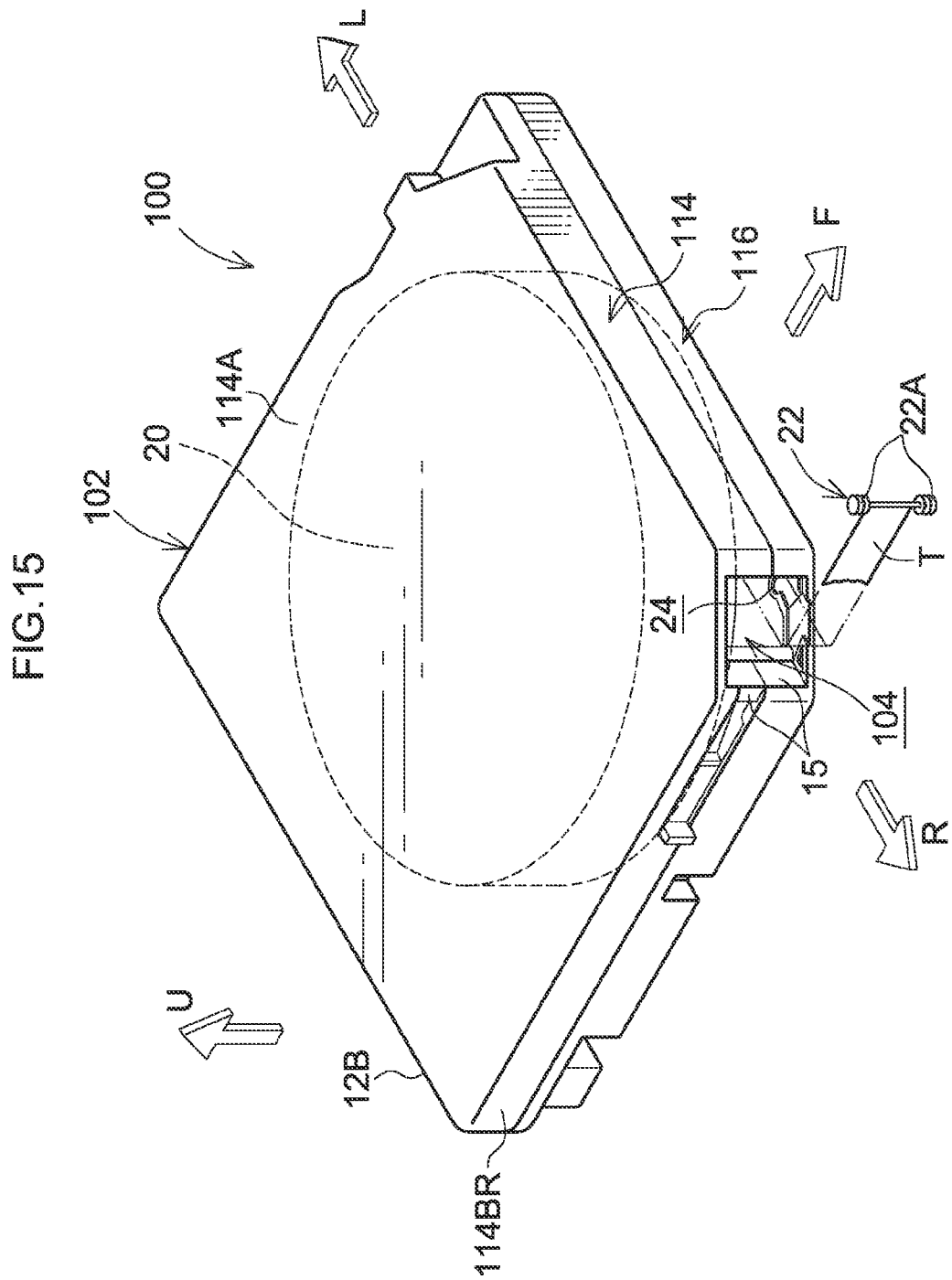
FIG. 15 is a perspective view showing the recording tape cartridge relating to the second exemplary embodiment of the present invention.

A second exemplary embodiment of the present invention is described next. Note that parts and portions that are basically the same as those of the above-described first exemplary embodiment are denoted by the same reference numerals as in the first exemplary embodiment, and description thereof is omitted. The exterior of a recording tape cartridge 100 relating to the second exemplary embodiment is shown in a perspective view in FIG. 15. An exploded perspective view of the recording tape cartridge 100 viewed from above is shown in FIG. 14. Note that illustration of the locking mechanism 48 is omitted from FIG. 14. As shown in FIG. 14 and FIG. 15, the recording tape cartridge 100 has a case 102.

To describe the portions of the case 102 that are different from the case 12, the case 102 is structured by joining together an upper case 114, at which an outer peripheral wall 114B stands downwardly from the peripheral edge of a ceiling plate 114A that is substantially rectangular, and a lower case 116, at which an outer peripheral wall 116B stands upwardly from the peripheral edge of a floor plate that is substantially rectangular. An opening 104, that opens so as to face both the right side and the front side, is formed in the front right corner portion of the case 102. The pin receiving recesses 24 are provided so as to look out onto the opening 104. The opening 104 is opened and closed by a door 106 that is curved in an arc shape in plan view. The door 106 is structured so as to open and close the opening 104 by moving along a locus of movement that runs along the arc shape thereof, without jutting-out and while being guided by guide grooves 108 that have the same curvature as that of the door 106 and are formed in the ceiling plate 114A, a floor plate 116A. Further, the screw bosses 15 are disposed at the both sides of the opening 104 at the case 102.

The case 102 has reel area ribs 110 that partition the reel space 34 and a rear portion space. Concretely, the reel area ribs 110 of the case 102 in the present exemplary embodiment are structured to include an arc-shaped wall that is continuous from the rear portion of the opening 104 to a vicinity of the center, in the front-back direction, of the left side wall 12L. Further, the case 102 has plural (three in the present exemplary embodiment) front-back ribs 112 that connect the reel area rib 110 and a rear upper wall 114BB that structures a rear wall 102B of the case 102.

Figure 16:
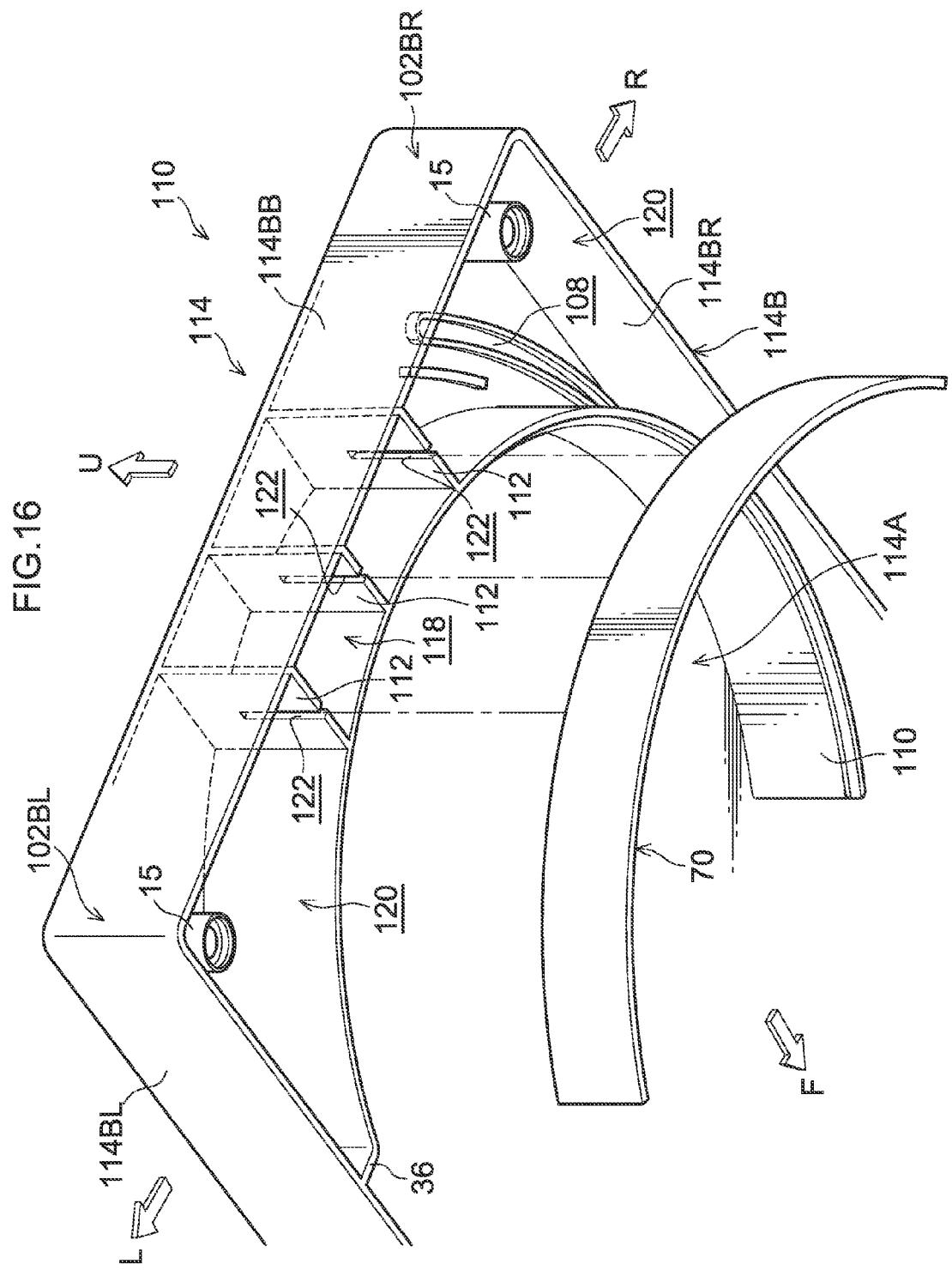
FIG. 16 is a perspective view showing a structure for mounting the UHF band RFID tag to an upper case that structures the recording tape cartridge relating to the second exemplary embodiment of the present invention.
Figure 17:
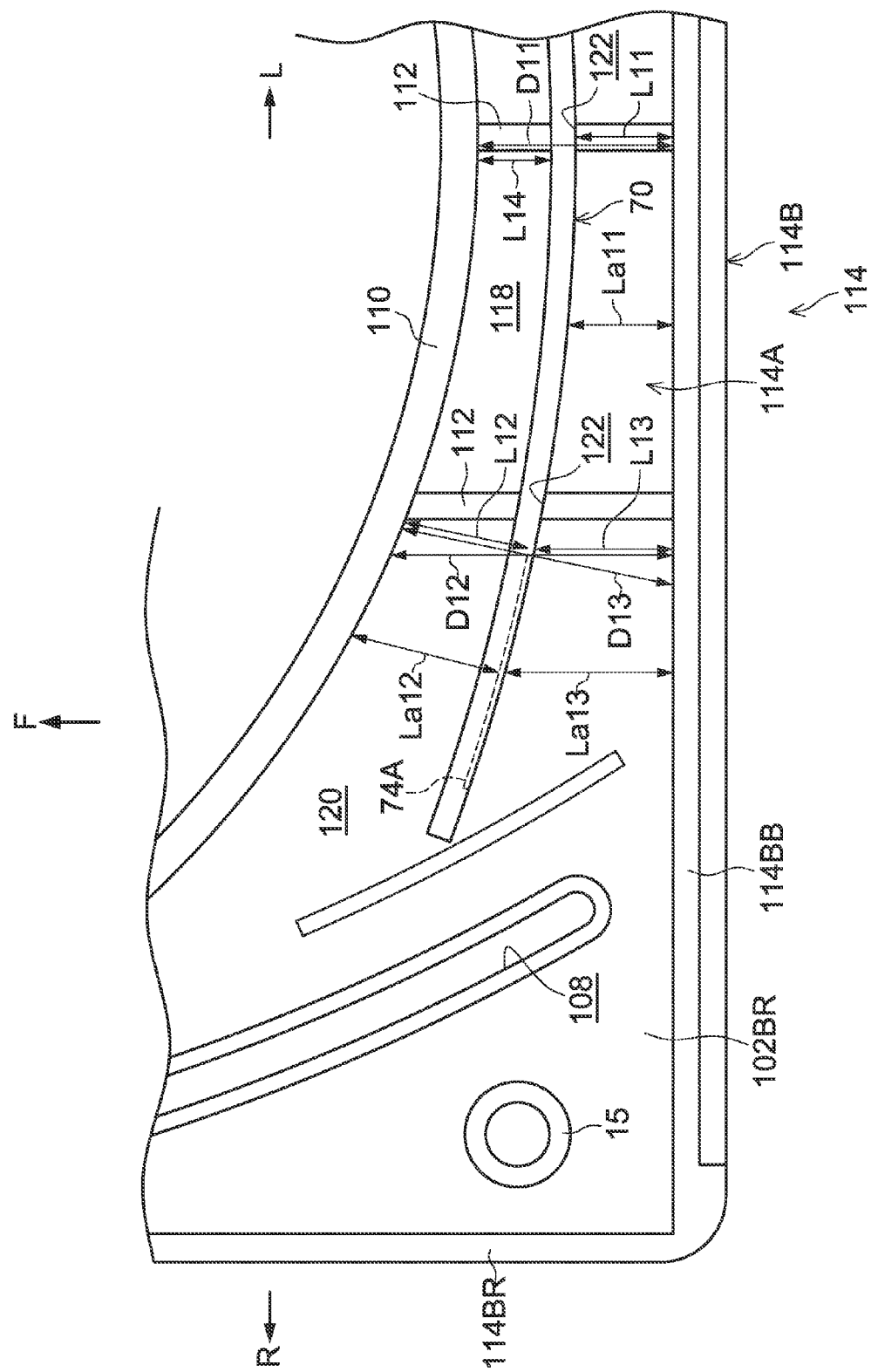
FIG. 17 is a bottom view showing a state in which the UHF band RFID tag is mounted to the upper case that structures the recording tape cartridge relating to the second exemplary embodiment of the present invention.

As shown in FIG. 16 and FIG. 17, the UHF band RFID tag 70 is housed in a power feed portion space 118, radiating portion spaces 120 that are disposed at the rear of the reel space 34 in which the reel 20 is disposed.

Figure 18:
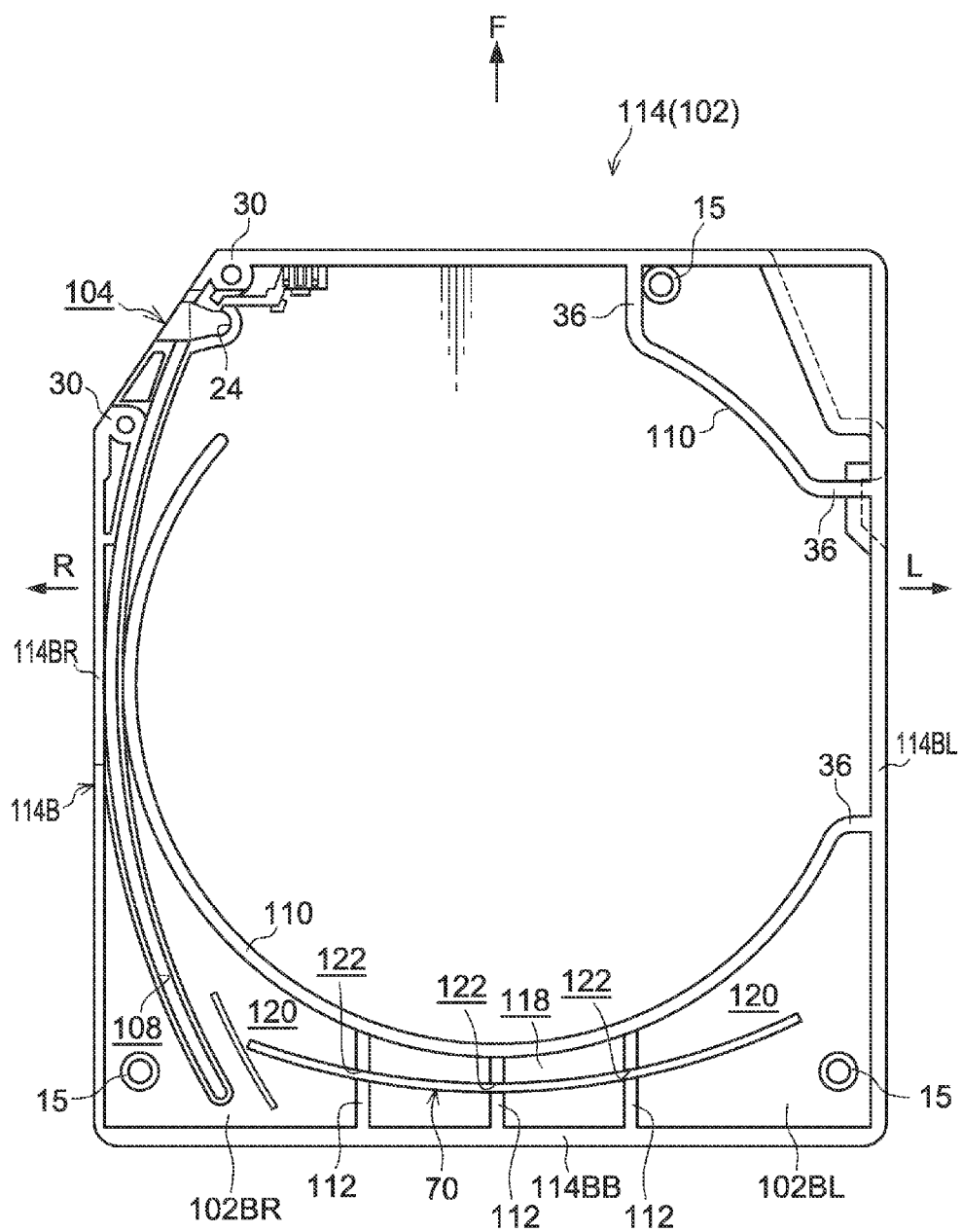
FIG. 18 is a bottom view showing the upper case that structures the recording tape cartridge relating to the second exemplary embodiment of the present invention.

As shown in FIG. 18 as well, the power feed portion space 118 is a space that is formed between the reel area rib 110 and the rear upper wall 114BB and the front-back ribs 112 at the right end and the left end. The radiating portion space 120 at the right side (the side at which the memory board M is disposed) is a space surrounded by the reel area rib 110, the rear upper wall 114BB, and an upper side wall 114BR that forms the side wall at the right side of the case 102 at the outer peripheral wall 114B. Namely, the radiating portion space 120 at the right side is disposed in a rear right corner portion 102BR of the case 102. As shown in FIG. 18 as well, this space is open toward the front in a vicinity of the opening 104 along the guide grooves 108. On the other hand, the radiating portion space 120 at the left side (the side at which the erroneous deletion preventing plug, that is omitted from the drawing, is disposed) is a space surrounded by the reel area rib 110, the connecting wall 36, the rear upper wall 114BB, and an upper side wall 114BL that forms the side wall at the left side of the case 102 at the outer peripheral wall 114B. Namely, the radiating portion space 120 at the left side is disposed in a rear left corner portion 102BL of the case 102.

The radiating portion spaces 120, in which are disposed the entire radiating portions 74A of the tag antenna 74 that structures the UHF band RFID tag 70, are spaces that are wider than the power feed portion space 118 in which at least the region of the power feed portion 74B, which region the IC chip 72 is connected to, is disposed. Concretely, as shown in FIG. 17, given that the minimum clearance in the front-back direction (the direction of thickness of the power feed portion 74B, the rear upper wall 114BB) between the reel area rib 110 and the rear upper wall 114BB, that is a wall that structures the power feed portion space 118, is D11, and the minimum clearance along the front-back direction between the rear upper wall 114BB and the reel area rib 110 that sandwich the radiating portion 74A is D12, and the minimum clearance along the thickness direction of the radiating portion 74A between the reel area rib 110 and the rear upper wall 114BB is D13, D12>D11 and D13>D11.

Further, the UHF band RFID tag 70 is housed within the upper case 114 such that the left and right radiating portions 74A are positioned at the substantially central portions in the front-back direction of the radiating portion spaces 120. Concretely, cut-out portions 122, into which the UHF band RFID tag 70 is placed, are formed in the respective front-back ribs 112 at the upper case 114. By placing the portion of the UHF band RFID tag 70, which portion is between the left and right radiating portions 74A, in the cut-out portions 122, the both end portion sides including the ranges at which the radiating portions 74A are set are accommodated in the radiating portion spaces 120, and the central portion is accommodated in the power feed portion space 118.

Figure 19:
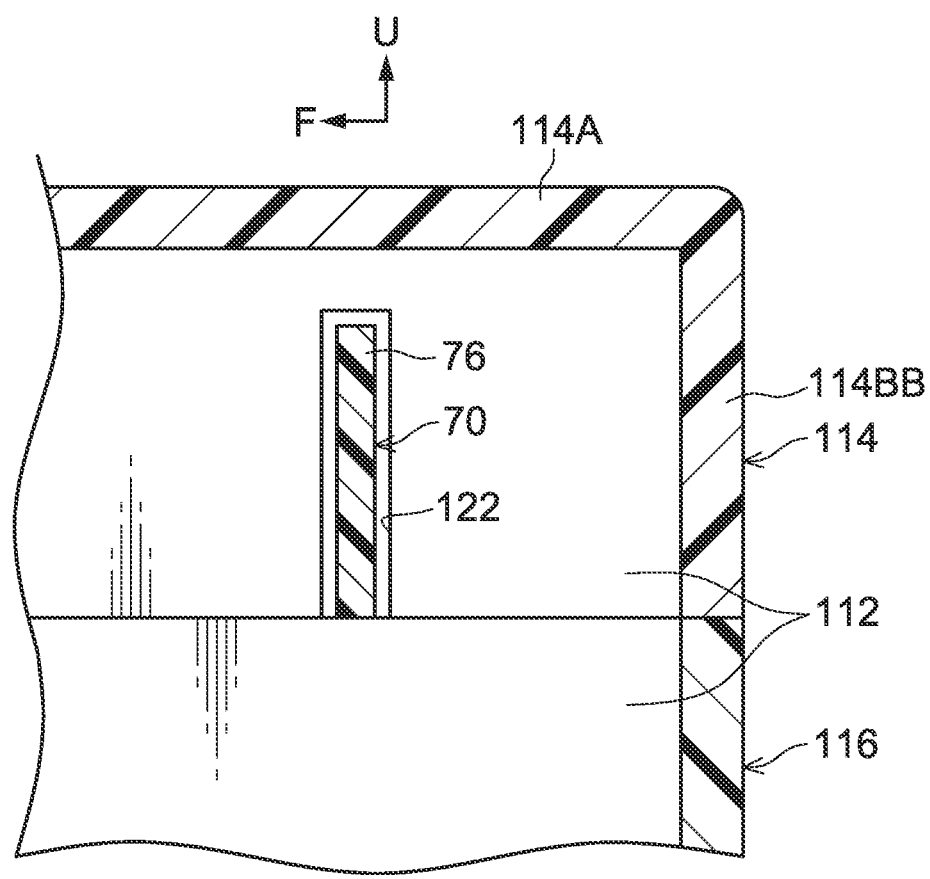
FIG. 19 is a side sectional view showing a structure for holding the UHF band RFID tag at a case that structures the recording tape cartridge relating to the second exemplary embodiment of the present invention.

In the present exemplary embodiment, in the state in which the lower case 116 is joined to the upper case 114 as shown in FIG. 19, the UHF band RFID tag 70 is held in the case 102 by the front-back ribs 112 of the lower case 116 abutting the front-back ribs 112 of the upper case 114. Note that the UHF band RFID tag 70 may, in the same way as in the case of the recording tape cartridge 10, be a structure that is held at the upper case 114 by the restoring force of the UHF band RFID tag 70 itself. Further, FIG. 14 shows an example in which two of the front-back ribs 112 of the lower case 116 are formed so as to correspond to the left and right both end front-back ribs 112 of the upper case 114. However, three of the front-back ribs 112 may be formed at the lower case 116 in correspondence with the three front-back ribs 112 of the upper case 114.

At the UHF band RFID tag 70 that is in the state of being held at the upper case 114 (the case 102), the distance between the central portion of the power feed portion 74B (the region at which the IC chip 72 is connected), and the nearer wall portion among the rear upper wall 114BB and the reel area rib 110 (in the present exemplary embodiment, the rear upper wall 114BB), is L11.

Further, given that the shortest distances between the range of the UHF band RFID tag 70 where the radiating portion 74A is set and the reel area rib 110, the rear upper wall 114BB are L12, L13, L12≈L13, and L12>L11, and L13>L11. Namely, the shortest distance from the radiating portion 74A to the wall at the near side among the walls that structure the radiating portion space 120 is set to be greater than the aforementioned distance L11. In the present exemplary embodiment, L12, L13>2 mm.

D12, D13, that are the clearances between the walls of the radiating portion space 120 that are positioned at the both sides sandwiching the radiating portion 74A as described above, are larger than D11 that is the clearance between the walls of the power feed portion space 118 that are positioned at the both sides sandwiching the power feed portion 74B. Therefore, considering that the thickness of the UHF band RFID tag 70 is sufficiently small, L12+L13>D11, and L14+L15>D11. Due thereto, the sum (L12+L13) of the distances from the radiating portion 74A to the reel area rib 110, the rear upper wall 114BB, that are the walls at the both sides thereof, is set to be greater than the sum (L11+L14≈D11) of the distances from the power feed portion 74B to the outermost peripheral portion of the magnetic tape T, the rear upper wall 114BB that are the walls at the both sides thereof.

Further, from the relationships of the above-described shortest distances and clearances, at the recording tape cartridge 100, an average distance La12 from the radiating portion 74A to the rear upper wall 114BB over the range at which the radiating portion 74A is set, and an average distance La13 from that radiating portion 74A to the reel area rib 110, are respectively made to be greater than an average distance La11 from the power feed portion 74B to the rear upper wall 114BB. In the present exemplary embodiment, the respective average distances La12, La13 to the rear upper wall 114BB, the reel area rib 110 over the range at which the radiating portion 74A is set, are respectively set to be greater than or equal to 4 mm. These average distances are realized by, as described above, placing the range in which the radiating portion 74A is set at the UHF band RFID tag 70 at the substantially central portion in the front-back direction of the radiating portion space 120 (i.e., by making La11≈La12).

Further, at the recording tape cartridge 100, the ranges in which the radiating portions 74A are set at the UHF band RFID tag 70 are set so as to not contact the screw bosses 15.

Here, in the recording tape cartridge 100 relating to the second exemplary embodiment, at least a portion of the range at which the radiating portion 74A is set at the UHF band RFID tag 70 does not contact the structural parts of the case 102 (the reel area rib 110, the rear upper wall 114BB, the screw boss 15, and the like). Further, the shortest distance between the radiating portion 74A and a structural part of the case 102 is 2 mm or more, and the average distance is 4 mm or more. For these reasons, at the recording tape cartridge 100, effects that are similar can be obtained by operations that are basically similar to those of the recording tape cartridge 10 relating to the first exemplary embodiment. Namely, at the recording tape cartridge 100, the built-in UHF band RFID tag 70 is not influenced by the permittivity of the case 102.

For example, if the radiating portions 74A of the UHF band RFID tag 70 are held at the power feed portion space 118, the distance between the radiating portions 74A and the case 102 (the reel area rib 110, the rear upper wall 114BB that structure the power feed portion space 118) becomes closer. Namely, the radiating portions 74A of the tag antenna 74 are easily affected by the permittivity of the case 102 (the reel area rib 110, the rear upper wall 114BB that structure the power feed portion space 118), and limitations arise on the design and performance of the tag antenna 74.

In contrast, in the recording tape cartridge 100, as described above, the built-in UHF band RFID tag 70 is not influenced by the dielectric constants of the case 102. In other words, effects of the materials (permittivity) of the case 102 are suppressed. Therefore, the degrees of freedom in designing the tag antenna 74 increase. Due thereto, as compared with a structure in which the tag antenna 74 is easily affected by the materials (permittivity) of the case 102, the tag antenna 74 can be made to be larger, which contributes to maintaining or enlarging the resonance frequency band width and to maintaining or improving the radiating efficiency. Further, by widening the resonance frequency band width of the tag antenna 74 to substantially the entire UHF band (860 MHz to 960 MHz), communication in respective countries and geographical regions in which the recording tape cartridge 100 is used becomes possible, and standardization of types of the recording tape cartridges 100 that contain the UHF band RFID tag 70 is aimed for.

Note that the structure for holding the UHF band RFID tag 70 at the case 12, 102 is not limited to the above-described examples. Structures relating to modified examples such as shown in FIG. 20 through FIG. 26 can be employed for example.

Figure 20:
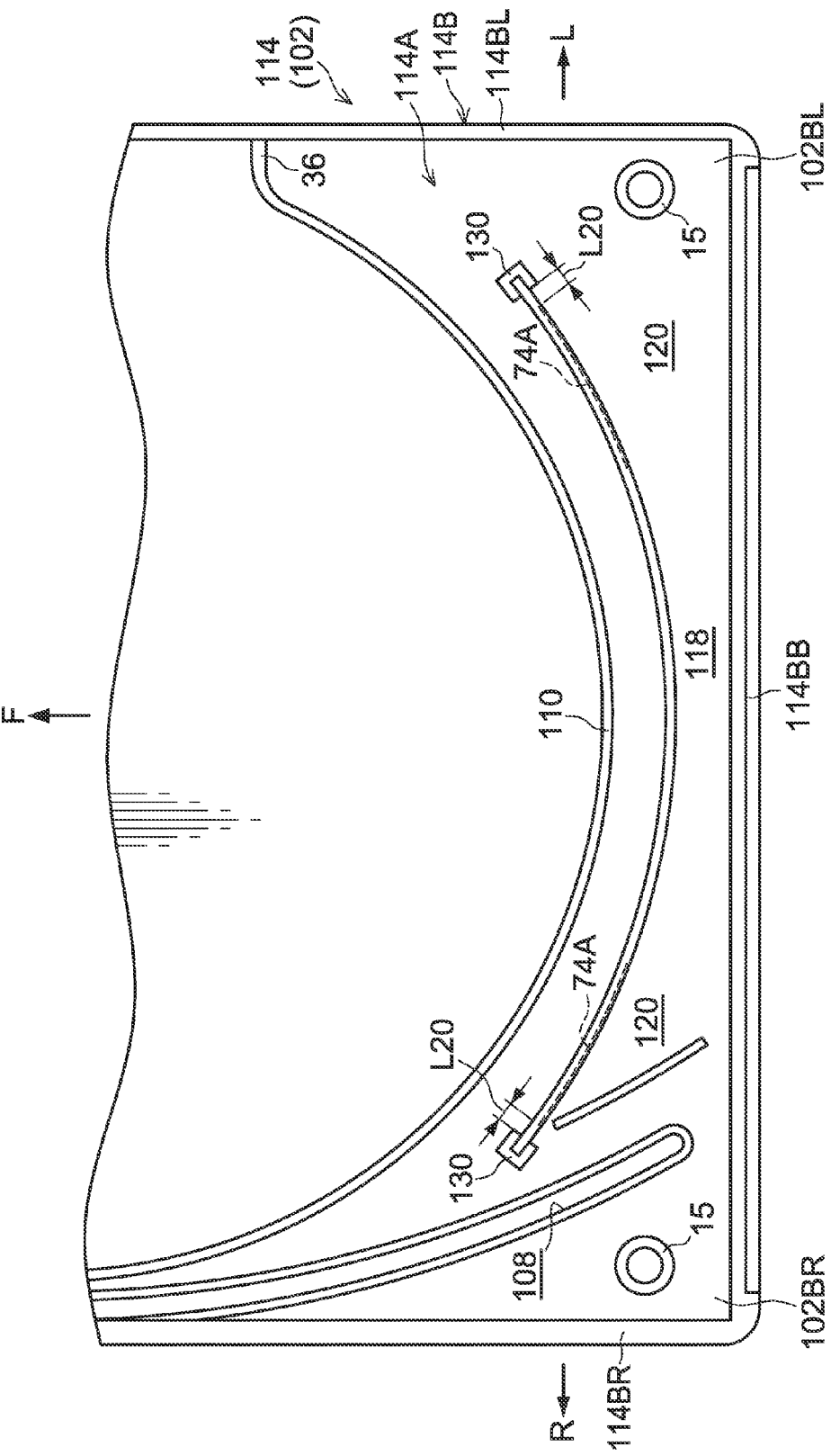
FIG. 20 is a bottom view showing a state in which the UHF band RFID tag is mounted to the upper case in a first modified example of the exemplary embodiments of the present invention.

In a first modified example shown in FIG. 20, a pair of holding projections 130, that serve as holding members and that are formed in substantial U shapes as seen in bottom view, are provided at the ceiling plate 114A of the upper case 114. The UHF band RFID tag 70 is held at the upper case 14, 114 due to the longitudinal direction both end portions of the base sheet 76, that is in an elastically deformed state, being placed in the holding projections 130. In this held state, a distance L20 to the holding projection 130 from the end portion of the radiating portion 74A is greater than or equal to 2 mm, and is preferably 4 mm. In this first modified example, an ideal state of holding the UHF band RFID tag 70, in which the radiating portions 74A of the UHF band RFID tag 70 are separated also from the structural parts of the case 102, can be realized. Further, in the first modified example, because the front-back ribs 112 are not provided (the power feed portion space 118 and the radiating portion spaces 120 are continuous), there are even fewer structural parts of the case 102 that are positioned adjacent to the radiating portions 74A.

Figure 21:
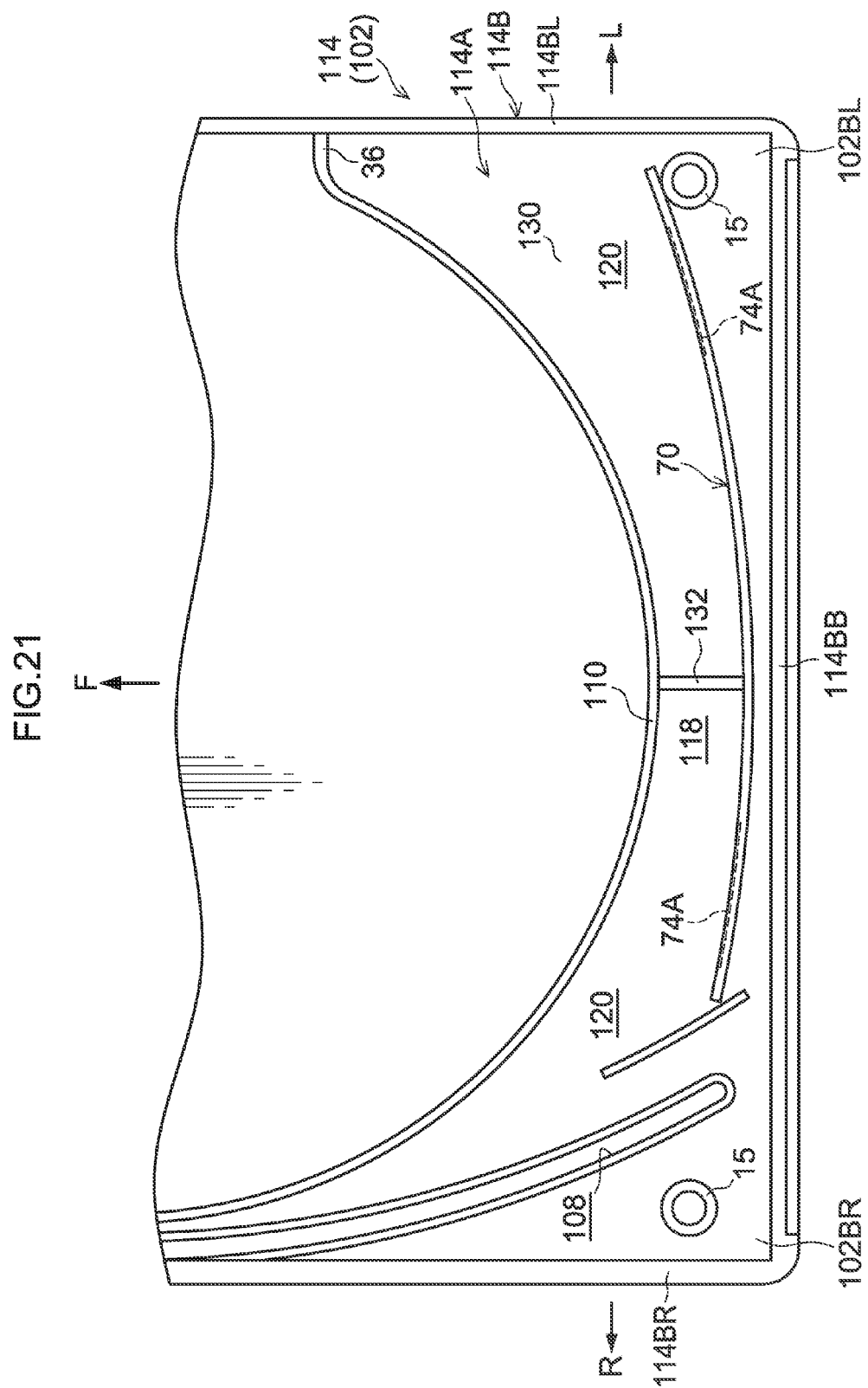
FIG. 21 is a bottom view showing a state in which the UHF band RFID tag is mounted to the upper case in a second modified example of the exemplary embodiments of the present invention.

In a second modified example shown in FIG. 21, the free state of the UHF band RFID tag 70 is a curved shape in which the curvature is smaller than in the flat state or the illustrated state. While this UHF band RFID tag 70 is elastically deformed in the direction in which the curvature becomes larger, the left end and right end of the UHF band RFID tag 70 are made to contact the screw bosses 15 from the front side, and the central portion of the UHF band RFID tag 70 is made to contact, from the rear side, a rib 132 that is provided instead of the front-back ribs 112. Due thereto, the UHF band RFID tag 70 is held at the case 102 by the elasticity thereof.

In this structure as well, the ranges of the UHF band RFID tag 70, at which ranges the radiating portions 74A are set, are set so as to not contact the screw bosses 15, or such that the contact width is less than or equal to 2 mm. In a case in which the set range of the radiating portion 74A does not contact the screw boss 15, the distance between (the longitudinal direction end portion of) the tag antenna 74 and the contact region of the screw boss 15 at the UHF band RFID tag 70 is preferably greater than or equal to 2 mm, and more preferably greater than or equal to 4 mm. On the other hand, in a structure in which the radiating portion 74A at the UHF band RFID tag 70 contacts the screw boss 15, because the peripheral surface of the screw boss 15 in the present exemplary embodiment is a cylindrical surface, a structure in which the contact width is 2 mm is realized. In this second modified example as well, because the front-back ribs 112 are not provided, there are even fewer structural parts of the case 102 that are positioned adjacent to the radiating portions 74A.

Figure 22:
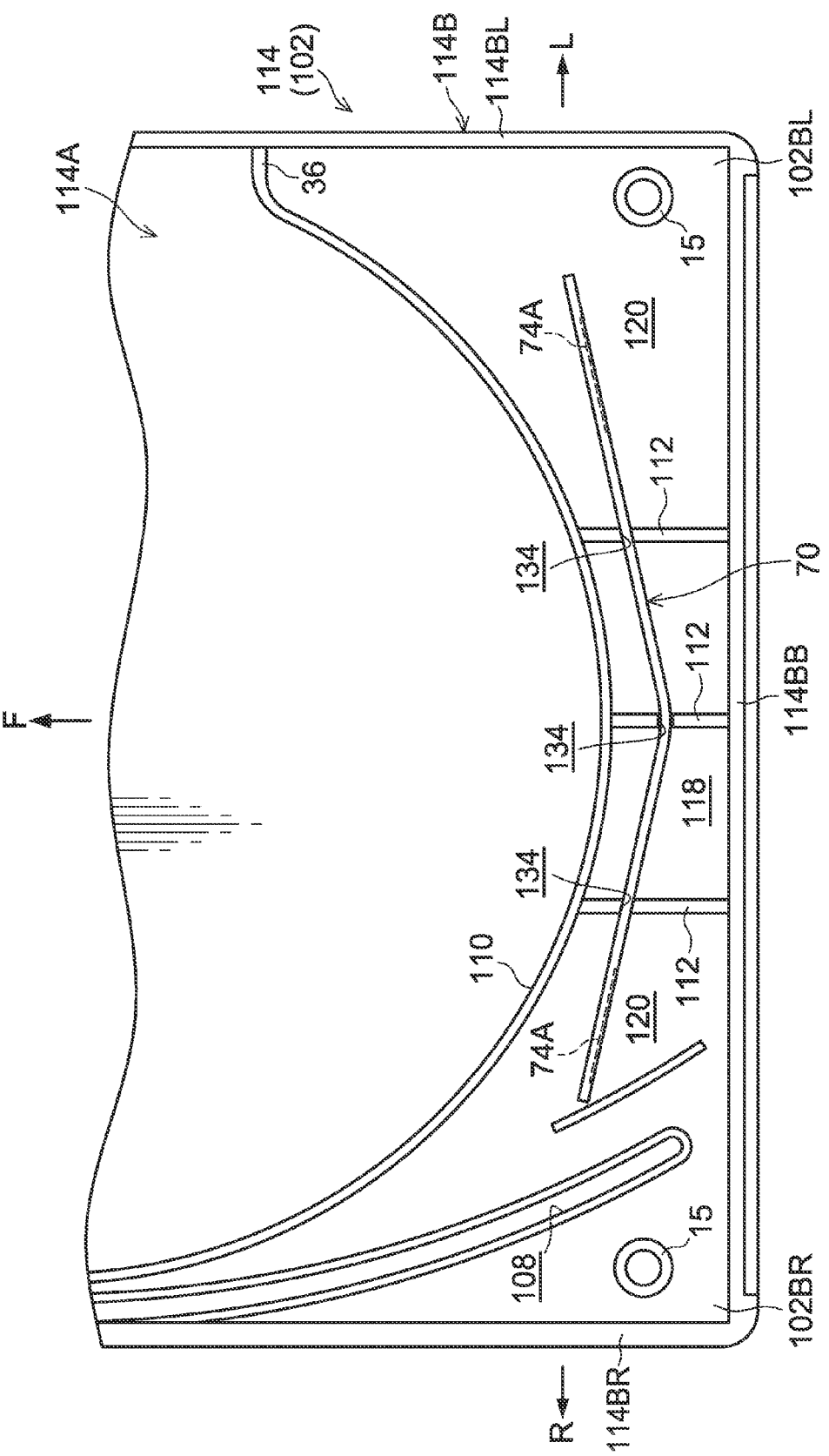
FIG. 22 is a bottom view showing a state in which the UHF band RFID tag is mounted to the upper case in a third modified example of the exemplary embodiments of the present invention.

In a third modified example shown in FIG. 22, the UHF band RFID tag 70, that is substantially flat in a free state, is placed in cut-out portions 134 that are formed alternately (with the front-back positional offset greater than in the second exemplary embodiment) in the three front-back ribs 112. Due thereto, the UHF band RFID tag 70 is held at the case 12, 102 such that the respective radiating portions 74A are positioned at the substantial centers, in the front-back direction, within the corresponding radiating portion spaces 120.

Further, in the examples shown in FIG. 21 and FIG. 22, the UHF band RFID tag 70 is disposed so as to be offset toward the left side (the right side in the drawings) in order to prevent interference with the door 106. Here, because the IC chip 72 is generally disposed at the longitudinal direction central portion of the UHF band RFID tag 70, the UHF band RFID tag 70, that is disposed so as to be offset as described above, is held by the front-back ribs 112 (the cut-out portions 134), the rib 132 at a position that is offset from the IC chip 72. Namely, holding of the UHF band RFID tag 70 by the front-back ribs 112 (the cut-out portions 134), the rib 132 at the region at which the IC chip 72 is set is avoided. Due thereto, the direct application of external force to the IC chip 72 from the front-back ribs 112 (the cut-out portions 134), the rib 132 is avoided, and stress on the IC chip 72 caused by the UHF band RFID tag 70 curving at the front-back ribs 112 (the cut-out portions 134), the rib 132 is avoided, and there is a state in which it is easy to protect the IC chip 72 (breakage does not arise thereat).

Figure 23:
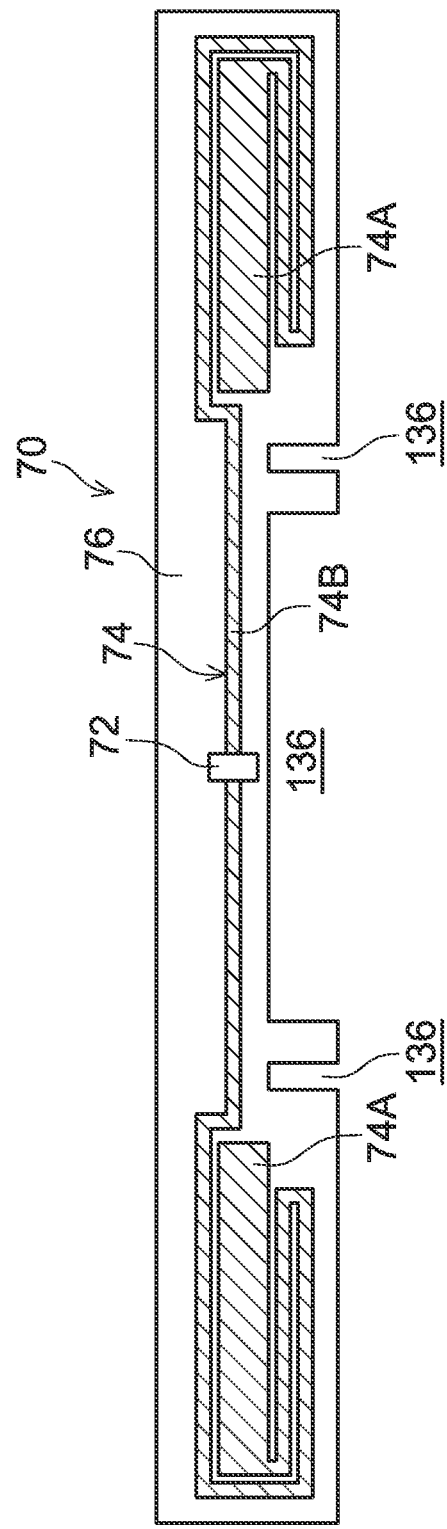
FIG. 23 is a front view showing a state in which the UHF band RFID tag is mounted to the upper case in a fourth modified example of the exemplary embodiments of the present invention.
Figure 24:
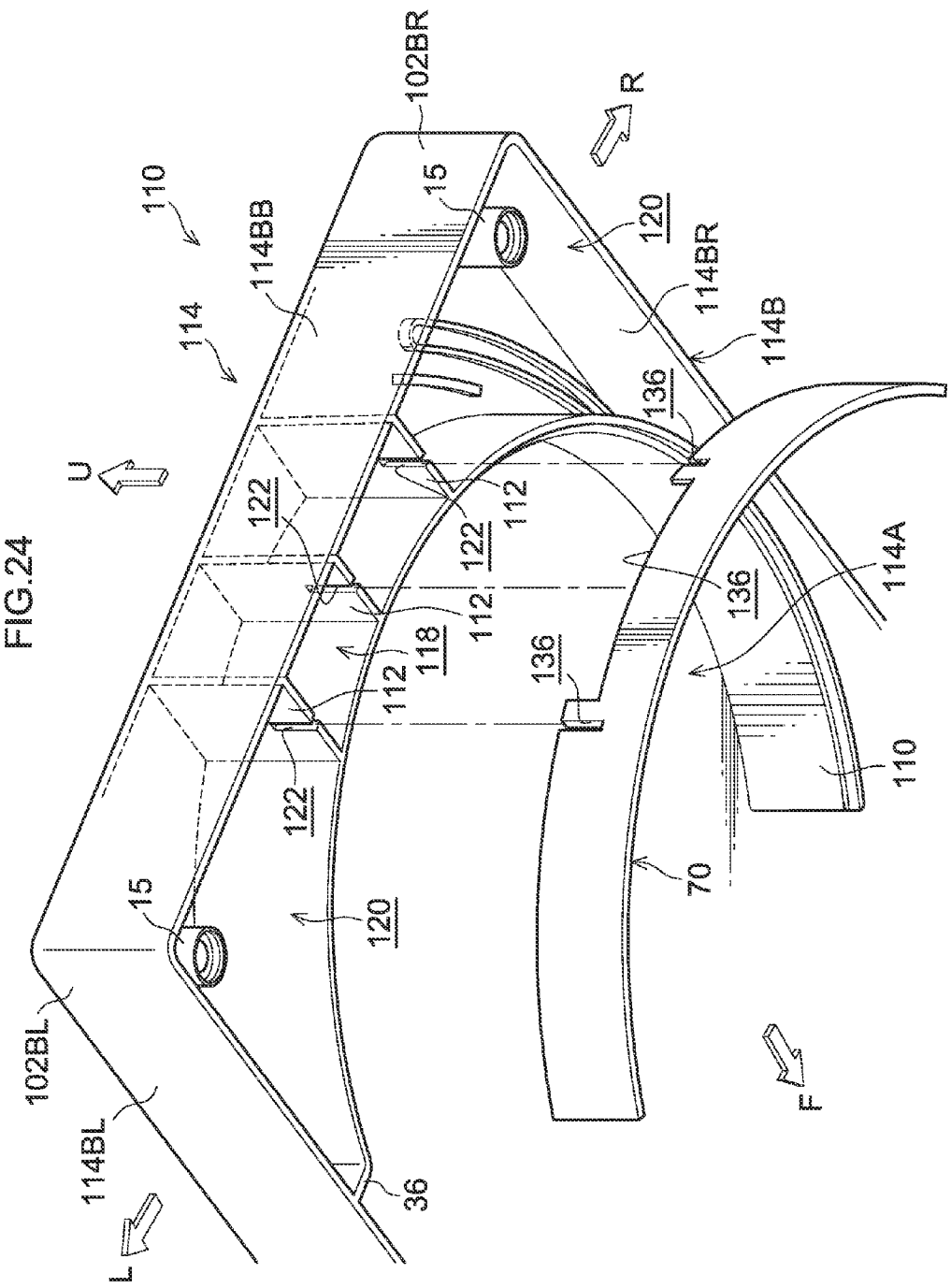
FIG. 24 is a perspective view showing a state in which the UHF band RFID tag is mounted to the upper case in the fourth modified example of the exemplary embodiments of the present invention.

In a fourth modified example shown in FIG. 23, cut-out portions 136 are formed in the base sheet 76 at portions that fit-into the cut-out portions 122. Three of the cut-out portions 136 are provided in correspondence with the three cut-out portions 122, but one or two of the cut-out portions 136 may be provided (some or all of the three cut-out portions 136 may be connected). In this fourth modified example, the portions remaining after cutting that are above (at the ceiling plate 114A side of) the cut-out portions 122 at the front-back ribs 112 fit into the cut-out portions 136. Therefore, as shown in FIG. 24, the depth of the cut-out portions 122 at the front-back ribs 112 is low, and an effect of reinforcing the upper case 114 (the case 102) by the front-back ribs 112 can be obtained. Namely, the front-back ribs 112 contribute to ensuring the rigidity of the case 102. Further, positioning of the UHF band RFID tag 70 with respect to the case 102 is easy.

Figure 25:
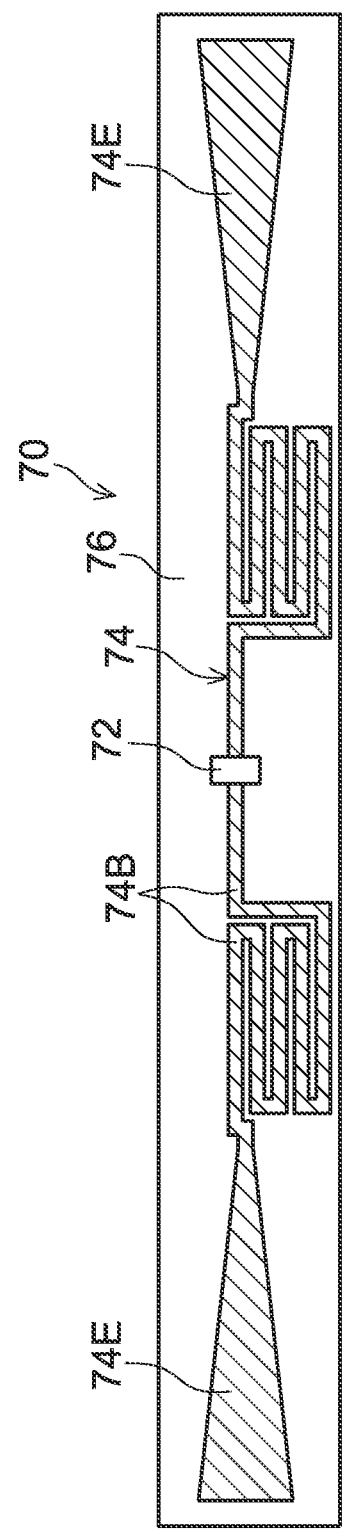
FIG. 25 is a front view showing the UHF band RFID tag relating to a fifth modified example of the exemplary embodiments of the present invention.
Figure 26:
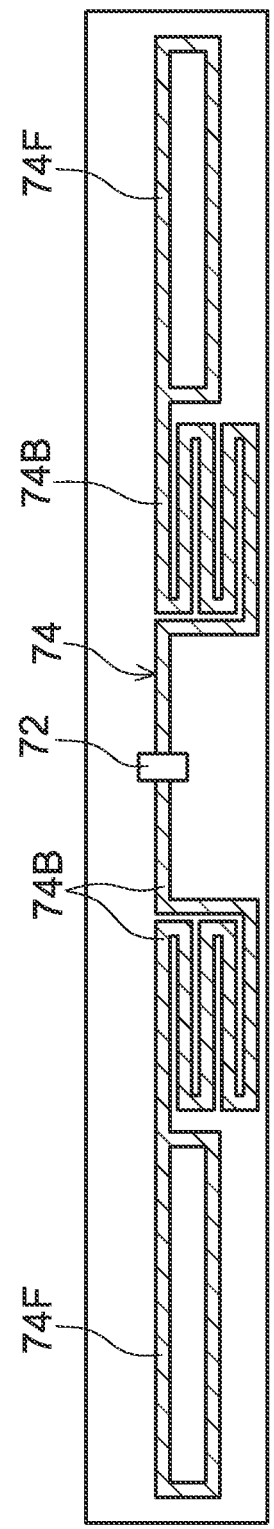
FIG. 26 is a front view showing the UHF band RFID tag relating to a sixth modified example of the exemplary embodiments of the present invention.

In a fifth modified example shown in FIG. 25, substantially triangular radiating portions 74E are formed instead of the rectangular radiating portions 74A. Further, in a sixth modified example shown in FIG. 26, rectangular frame shaped radiating portions 74F are formed instead of the rectangular radiating portions 74A. In this way, it is preferable to make the radiating portions at the tag antenna 74 be portions that are formed to have wider widths than the power feed portion (at least the vicinity of the connection region of the IC chip 72), or be portions of the tag antenna 74 that include these wide-width portions. However, the present invention does not exclude structures in which the radiating portions and the power feed portion are formed to be the same width.

Further, the present invention is not limited to the structures of the above-described exemplary embodiments and modified examples, and can, of course, be implemented by being modified in various ways. For example, the radiating portion 74A is not limited to the preferred structure of being set apart by a shortest distance of 2 mm or more and an average distance of 4 mm or more from a wall that structures the radiating portion space 80. The radiating portion 74A may be structured such that the average distance to a wall structuring the radiating portion space 80 is 2 mm or more.

In the above-described respective exemplary embodiments, the rear upper wall 14BB, the reel area rib 32, the upper guide wall 66, the outermost peripheral portion (surface) of the magnetic tape T, the screw bosses 15, the rear upper wall 114BB, the reel area rib 110, and the like are given as examples of the boundary portions of the radiating portion spaces 80, 120, the power feed portion space 78, 118. However, the present invention is not limited to the same. For example, wall-shaped structures, standing-plate-shaped structures, slit-shaped structures (plural rod-shaped bodies being formed in parallel), grid-shaped structures, protruding-rod-shaped protrusions, and the like that structure the case 12, 102, can be given as examples of the boundary portions of the radiating portion spaces 80, 120, the power feed portion space 78, 118. Here, a wall that serves as the boundary portion is a planar surface or curved surface portion that is provided so as to extend along (can face while planarly-contacting or being in very close proximity to) the radiating portion 74A (the power feed portion 74B), and is different than a rod-shaped protrusion (an aggregate of rod-shaped protrusions) that the radiating portion 74A or the like linearly-contacts (refer to the example of the screw boss 15) or point-contacts. Namely, a wall that serves as a boundary portion can be interpreted as a portion whose permittivity easily affects the radiating portion 74A, as compared with an another standing portion such as a rod-shaped protrusion (an aggregate of rod-shaped protrusions) or the like. Further, among such walls, walls that are disposed within the case 12, 102, i.e., walls that are disposed at the inner side of the outer peripheral wall 14B, 114B, can be interpreted as inner walls (e.g., the reel area ribs 32, 110, the upper guide wall 66, the connecting walls 36, and the like).

Further, the foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A recording tape cartridge comprising:
    a reel around which a recording tape is wound;
    an RFID tag that includes an antenna formed such that radiating portions are disposed at both sides of a power feed portion; and
    a case having a reel space in which the reel is housed, a power feed portion space in which a central portion of the antenna that includes a portion of the power feed portion is housed, and radiating portion spaces in which the radiating portions of the antenna are housed respectively; and
    boundary portions comprising an outer peripheral wall of the case, and a separating wall that stands at an inner side of the case, the separating wall partitioning the reel space from the power feed portion space and the radiating portion spaces, at least a portion of each radiating portion space being surrounded by the separating wall and the outer peripheral wall, and the separating wall and the outer peripheral wall not contacting either radiating portion.

2. The recording tape cartridge of claim 1, wherein, at the case, a clearance between boundary portions that structure a radiating portion space, in a normal line direction of the corresponding radiating portion or these boundary portions, is larger than a clearance between boundary portions that structure the power feed portion space, in a normal line direction of these boundary portions or the power feed portion.

3. The recording tape cartridge of claim 1, wherein the case is structured such that one of the radiating portion spaces is disposed in one corner portion that is positioned at an outer side of the reel as seen from an axial direction of the reel, and the other of the radiating portion spaces is disposed in another corner portion that is adjacent, in a round direction, to the corner portion.

4. The recording tape cartridge of claim 1, wherein a clearance between a portion, that is nearest to a radiating portion at boundary portions that structure the corresponding radiating portion space, and the radiating portion is greater than a distance between a portion, that is nearest to the power feed portion at boundary portions that structure the power feed portion space, and the power feed portion.

5. The recording tape cartridge of claim 1, wherein a sum of distances between respective boundary portions, that are positioned at both sides in a thickness direction of a radiating portion at a corresponding radiating portion space, and the radiating portion is greater than a sum of distances between respective boundary portions, that are positioned at both sides in a thickness direction of the power feed portion at the power feed portion space, and the power feed portion.

6. The recording tape cartridge of claim 1, wherein each radiating portion of the antenna is disposed so as to be apart, by greater than or equal to 2 mm, from boundary portions that structure the corresponding radiating portion space.

7. The recording tape cartridge of claim 1, wherein each radiating portion of the antenna is disposed so as to be apart, by greater than or equal to 4 mm, from boundary portions that structure the corresponding radiating portion space.

8. The recording tape cartridge of claim 1, wherein the case has:
    a standing portion that stands at an inner side of the outer peripheral wall, and
    a space that is sandwiched between the standing portion and the outer peripheral wall, or a space that is sandwiched between respective standing portions that project-out in a transverse direction of the recording tape,
    wherein each standing portion is at least a portion of a radiating portion space.

9. The recording tape cartridge of claim 1, wherein each radiating portion is disposed within the corresponding radiating portion space at a substantially central portion between boundary walls that are respectively positioned at both sides in a thickness direction with respect to the radiating portion.

10. The recording tape cartridge of claim 1, wherein the outer peripheral wall and the separating wall are walls that form the boundary portions at respectively different sides, in a thickness direction of the radiating portion, at the radiating portion space, and the radiating portion is disposed within the radiating portion space such that a distance from the radiating portion to the outer peripheral wall and a distance from the radiating portion to the separating wall are equal.

11. The recording tape cartridge of claim 1, wherein at least a portion of boundary portions that structure each radiating portion space at the case is a wall that stands within the case so as to face the corresponding radiating portion.

12. The recording tape cartridge of claim 1, wherein the RFID tag is supported at the case such that the power feed portion contacts a boundary portion that structures the power feed portion space.

13. The recording tape cartridge of claim 1, wherein the RFID tag is held at the case via a holding member that does not contact a region of the RFID tag at which region each radiating portion is formed.

14. The recording tape cartridge of claim 1, wherein the RFID tag is held at the case via a holding member at which a width of a portion contacting a region of the RFID tag, at which region a radiating portion is formed, is less than or equal to 2 mm.

* * * * *